US012458783B2

(12) United States Patent
Callister et al.

(10) Patent No.: US 12,458,783 B2
(45) Date of Patent: Nov. 4, 2025

(54) CEREBROSPINAL FLUID SHUNT

(71) Applicant: Azygos Vascular, Inc., Deephaven, MN (US)

(72) Inventors: Jeffrey Callister, Deephaven, MN (US); Jacob Jaeger, Deephaven, MN (US); Benjamin Callister, Deephaven, MN (US); Ryan Bauer, Deephaven, MN (US); Emma Spurgat, Deephaven, MN (US)

(73) Assignee: AZYGOS VASCULAR, INC., Deephaven, MN (US)

( * ) Notice: Subject to any disclaimer, the term of this patent is extended or adjusted under 35 U.S.C. 154(b) by 0 days.

(21) Appl. No.: 19/177,127

(22) Filed: Apr. 11, 2025

(65) Prior Publication Data

US 2025/0319289 A1 Oct. 16, 2025

Related U.S. Application Data

(60) Provisional application No. 63/633,467, filed on Apr. 12, 2024.

(51) Int. Cl.
*A61M 27/00* (2006.01)
*A61B 17/34* (2006.01)
(Continued)

(52) U.S. Cl.
CPC ...... *A61M 27/006* (2013.01); *A61M 25/0102* (2013.01); *A61M 25/0108* (2013.01);
(Continued)

(58) Field of Classification Search
CPC ................ A61M 27/006; A61M 25/04; A61M 2202/0464; A61M 2210/0687;
(Continued)

(56) References Cited

U.S. PATENT DOCUMENTS

2002/0169377 A1\* 11/2002 Khairkhahan . A61B 17/320725
600/433
2006/0184098 A1\* 8/2006 Barnitz ................... A61M 1/77
604/43
(Continued)

FOREIGN PATENT DOCUMENTS

WO 2017/075544 A1 5/2017
WO WO-2023250086 A1 \* 12/2023 ............ A61M 25/04

OTHER PUBLICATIONS

PCT, Notification of Transmittal of the International Search Report and the Written Opinion of the International Searching Authority, or the Declaration, in application No. PCT/US2025/024393, mailed Jul. 28, 2025 (14 pages).

*Primary Examiner* — Adam Marcetich
(74) *Attorney, Agent, or Firm* — MCANDREWS, HELD & MALLOY, LTD.

(57) ABSTRACT

A shunt delivery system includes: a stylet configured to puncture a vein wall, interstitial tissue, and a dura; a dilator including a transverse hollow interior region extending to an aperture in a distal region, the dilator configured to receive the stylet in the hollow interior region and out through the aperture in the distal region, the dilator configured to pass through tissues punctured by the stylet, including the vein wall, the interstitial tissue, and the dura; and a transdural catheter including a hollow interior region configured to receive the stylet, the transdural catheter configured to traverse the tissues dilated by the dilator, including the vein wall, the interstitial tissue, and the dura, such that a distal tip of the transdural catheter is configured to be located in a thecal sac of the patient.

20 Claims, 35 Drawing Sheets

(51) Int. Cl.
*A61M 25/01* (2006.01)
*A61M 25/04* (2006.01)

(52) U.S. Cl.
CPC ......... *A61M 25/04* (2013.01); *A61B 17/3468* (2013.01); *A61B 17/3496* (2013.01); *A61M 2205/0266* (2013.01); *A61M 2210/1003* (2013.01); *A61M 2210/12* (2013.01)

(58) Field of Classification Search
CPC ........ A61M 2210/0693; A61M 25/065; A61M 25/0662; A61M 27/002; A61M 2025/0007; A61M 2025/0042; A61M 2025/0681; A61M 2039/0232; A61M 2039/0291; A61M 2210/1003; A61B 17/3478; A61B 17/3401; A61B 17/3468; A61B 2017/22077; A61B 17/00234; A61B 2017/00292
See application file for complete search history.

(56) References Cited

U.S. PATENT DOCUMENTS

| | | | | |
|---|---|---|---|---|
| 2007/0021739 | A1* | 1/2007 | Weber | A61B 18/24 606/15 |
| 2009/0254061 | A1* | 10/2009 | Baron | A61B 17/3401 604/173 |
| 2010/0179562 | A1* | 7/2010 | Linker | A61N 1/0551 607/117 |
| 2012/0259263 | A1* | 10/2012 | Celermajer | A61B 17/320016 604/509 |
| 2013/0204124 | A1* | 8/2013 | Duindam | A61B 34/20 604/272 |
| 2014/0276347 | A1* | 9/2014 | Stone | A61M 27/002 604/9 |
| 2014/0343348 | A1* | 11/2014 | Kaplan | A61M 5/158 604/21 |
| 2016/0136398 | A1* | 5/2016 | Heilman | A61M 25/0108 604/9 |
| 2017/0296781 | A1* | 10/2017 | Sapir | A61F 2/2427 |
| 2019/0160254 | A1* | 5/2019 | Anand | A61M 5/168 |
| 2020/0030588 | A1* | 1/2020 | Heilman | A61M 25/0113 |
| 2020/0069927 | A1* | 3/2020 | Malek | A61M 25/0054 |
| 2020/0238019 | A1* | 7/2020 | Caroll | A61M 5/3245 |
| 2020/0375766 | A1* | 12/2020 | Malek | A61B 17/3468 |
| 2020/0406018 | A1* | 12/2020 | Malek | A61M 39/0247 |
| 2021/0161637 | A1* | 6/2021 | Eigler | A61F 2/91 |
| 2021/0353913 | A1* | 11/2021 | Balkovec | A61M 25/09041 |
| 2023/0000476 | A1* | 1/2023 | Farnan | A61B 17/0057 |
| 2023/0114949 | A1* | 4/2023 | Savastano | A61B 17/22 606/48 |
| 2023/0364395 | A1* | 11/2023 | Meyer | A61M 27/006 |
| 2024/0115842 | A1* | 4/2024 | Malek | A61M 27/006 |
| 2024/0277985 | A1 | 8/2024 | Gobin et al. | |

* cited by examiner

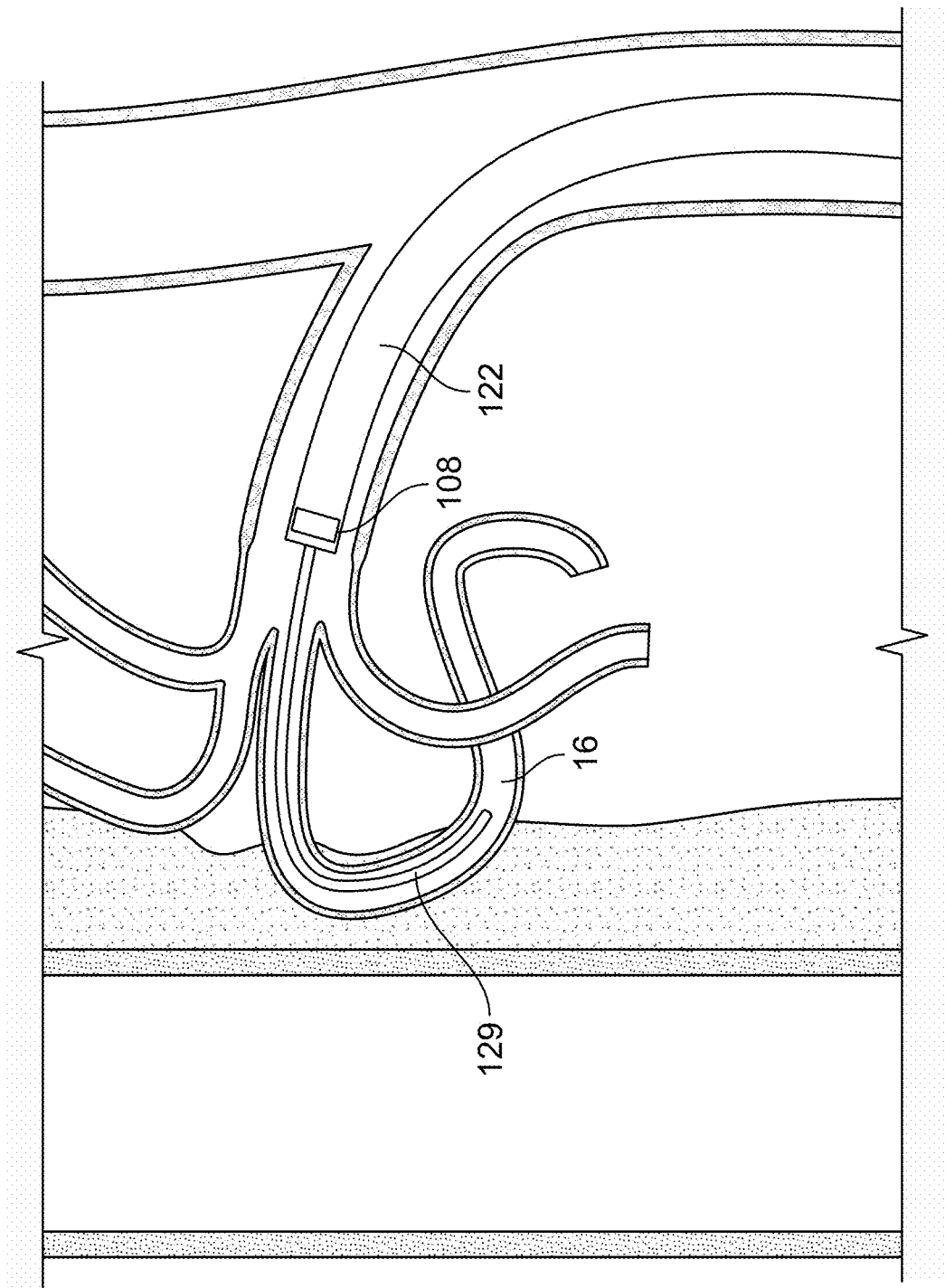

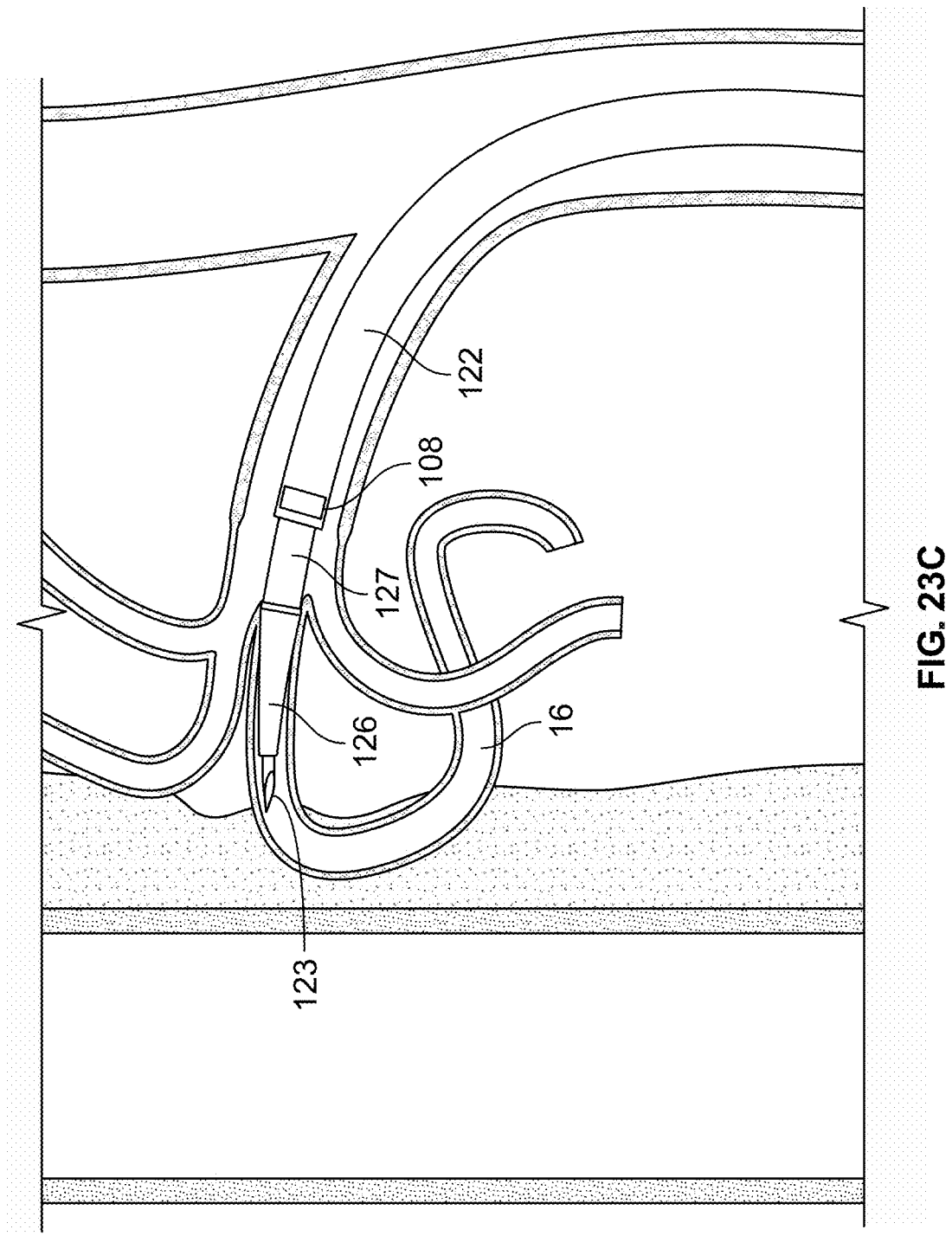

CEREBROSPINAL FLUID SHUNT

CROSS REFERENCE TO RELATED APPLICATIONS

This application claims the benefit of U.S. Prov. No. 63/633,467, filed on Apr. 12, 2024, the entirety of which are incorporated by reference, herein.

FIELD

Generally, this application relates to cerebrospinal fluid (CSF) shunts and methods and systems for delivery or implantation of CSF shunts in a patient.

BACKGROUND

There is a need for techniques, including methods, CSF shunts, and CSF shunt delivery systems to implant a CSF shunt in a patient's spinal region using intravenous catheterization. This can help patients who could benefit from drainage of the CSF into the veins such as patients with hydrocephalus, idiopathic intracranial hypertension, or normal pressure hydrocephalus.

SUMMARY

According to embodiments, a shunt delivery system includes: a stylet configured to puncture a vein wall, tissue in interstitial tissue, and a dura of a patient; a dilator including a transverse hollow interior region extending to an aperture in a distal region, wherein the dilator is configured to receive the stylet in the hollow interior region and out through the aperture in the distal region, wherein the dilator is configured to pass through tissues punctured by the stylet, including the vein wall, the tissue in the interstitial tissue, and the dura; and a transdural catheter including a hollow interior region configured to receive the stylet, wherein the transdural catheter is configured to traverse the tissues dilated by the dilator, including the vein wall, the tissue in the interstitial tissue, and the dura, such that a distal tip of the transdural catheter is configured to be located in a thecal sac of the patient such that a distal end of a cerebrospinal fluid (CSF) shunt can be advanced through the transdural catheter from a vein and into the thecal sac. The shunt delivery system can include a guide catheter including a hollow interior region configured to receive the transdural catheter, such that the transdural catheter can be advanced through the dura. The dilator can be tapered downwardly from a proximal region of the dilator to a distal region of the dilator. The stylet can include superelastic nitinol. Radiopaque markers can be included on or in each one of the stylet, dilator, and transdural catheter to facilitate positioning of the shunt delivery system using fluoroscopy.

According to embodiments, a system includes a CSF shunt and a sheath. The CSF shunt includes: a shunt head in a distal region of the CSF shunt, wherein the shunt head includes an inlet in a distal region of the shunt head, wherein the shunt head further includes an abutment region; and a shut body coupled to the shunt head. The sheath includes a hollow interior region and a distal region, wherein the hollow interior region is configured to receive the shunt body, and wherein the distal region is configured to abut the abutment region of the shunt head such that the shunt head can be advanced through a patient by applying a force to the sheath. The CSF shunt can further include a proximal cap, and wherein the system further comprises a stylet configured to pass through the CSF shunt extending through the proximal cap. The stylet can include an engagement feature configured to couple with the shunt head. The system can further include a proximal support catheter arranged to inhibit the CSF shunt from retrograde movement during deployment. After deployment of the CSF shunt, the abutment region of CSF shunt can be configured to be located on a distal side of the patient's dura and a rib is configured to be located on a proximal side of the patient's dura.

According to embodiments, a shunt delivery system includes a stylet including a first curve and a second curve distal from the first curve, wherein the first curve and the second curve define a proximal segment, a medial segment, and a distal segment of the stylet, wherein the proximal segment and the medial segment are in a first plane, and wherein the distal segment is in a second plane different from the first plane. The first curve can have a radius between about 15 cm to about 25 cm. The central angle of the first curve can be between about 40 degrees to about 70 degrees. The second curve can have a radius between about 10 cm to about 20 cm. The central angle of the second curve can be between about 40 degrees to about 70 degrees.

According to embodiments, a CSF shunt includes: a shunt body; a shunt head distal from the shunt body; and a plurality of ribs between the shunt body and the shunt head, wherein a most proximal one of the plurality of ribs is arranged to be located in a vein of a patient after the CSF shunt has been deployed. The shunt head can include at least one port configured for CSF to flow through when the CSF shunt is deployed. At least one of the plurality of ribs can include a vertical region. The CSF shunt can further include a radiopaque marker distal from the plurality of ribs and a radiopaque marker proximal from the plurality of ribs, wherein the radiopaque markers are configured to indicate to a surgeon that the plurality of ribs have been positioned in a thecal sac, in interstitial tissue, and in the vein. The CSF shunt can further include an engagement feature configured to engage with a retention wire.

BRIEF DESCRIPTION OF SEVERAL VIEWS OF THE DRAWINGS

FIGS. 23A, 23B, and 23C illustrate an embodiment of a technique for deploying the CSF shut.

Figure 1A:
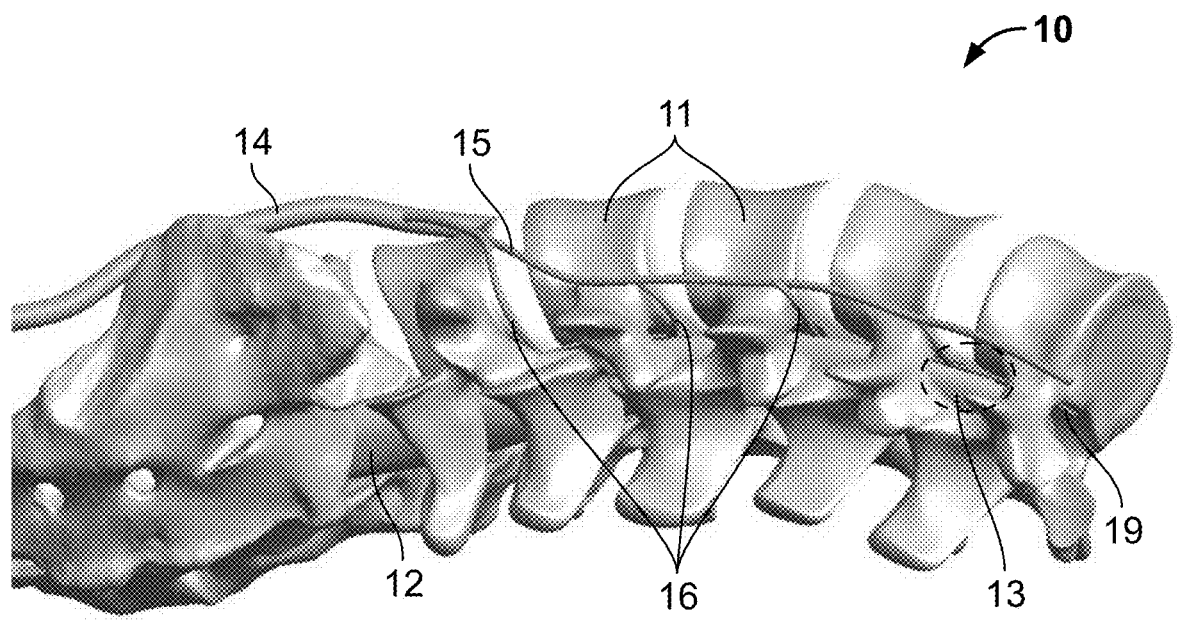
FIGS. 1A, 1B, and 1C illustrate different views of a patient's anatomy in the lumbar region.

The foregoing summary, as well as the following detailed description of certain techniques of the present application, will be better understood when read in conjunction with the appended drawings. For the purposes of illustration, certain techniques are shown in the drawings. It should be understood, however, that the claims are not limited to the arrangements and instrumentality shown in the attached drawings. Furthermore, the appearance shown in the drawings is one of many ornamental appearances that can be employed to achieve the stated functions of the system.

DETAILED DESCRIPTION

Transcatheter CSF shunt deployment requires accessory means and methods to facilitate proper placement of a CSF shunt in the thecal sac and venous system. Also, additional features can be required on the CSF shunt to integrate with a delivery system. Furthermore, interactions with the native anatomy can be utilized to facilitate proper CSF shunt deployment.

Embodiments herein include CSF shunts and systems and methods for delivering or implanting CSF shunts. According to some embodiments, a transdural catheter extends across the dura, and a CSF shunt is delivered through the transdural catheter, such that the shunt head is in the thecal sac after implantation. According to these embodiments, a stylet can incise and puncture tissue along the delivery path (vein wall, interstitial tissue, and dura). Following the stylet, a dilator can dilate the punctured tissue. Following the dilator, the transdural catheter can be advanced through the dilated, punctured tissue. The use of a transdural catheter can be beneficial to further dilate the tissue and allow passage of the CSF shunt through the center lumen of the transdural catheter, so the CSF shunt can be placed across the vein wall, interstitial tissue, and dura.

According to some embodiments, a sheath may sheathe the CSF shunt during implantation, and may be subsequently removed from the CSF shunt once the CSF shunt has been implanted. The sheath can push against a shunt head on the CSF shunt to advance the CSF shunt during implantation. The sheath may be beneficial because it can advance the CSF shunt into position by while protecting the proximal body and flow regulator of the shunt during delivery.

According to some embodiments, a self-orienting stylet may automatically orient itself when it reaches a predetermined location in the patient's anatomy. The stylet can have bends in at least two planes. The stylet at the bends may be compressed (the bends may be opened wider) as the stylet is advanced into the patient When the first bend reaches a predetermined location (e.g., at the intersection between the lumbar vein and an intervertebral vein), the stylet may decompress at the first bend (the first bend may close to its uncompressed position). This movement of the stylet at the first bend also causes the orientation of the second bend to be adjusted. The second bend may be adjusted such that the tip of the stylet becomes substantially perpendicular to the dura. This may be beneficial because the stylet can self-orient in a preferred way to allow for greater and/or more even pressure to be applied by the stylet to the dura without the surgeon having to orient the stylet.

The delivery and deployment of the CSF shunt using the shunt delivery system can be performed on the left or right side of a patient's lumbar. The pertinent anatomies on the left side and the right side in the lumbar region are effectively mirror images. Certain disclosure herein is with respect to delivery and deployment of the CSF shunt on the left side (e.g., FIGS. 2A and 2B), although the principles herein are also applicable to right-side procedures as well.

Figure 1B:
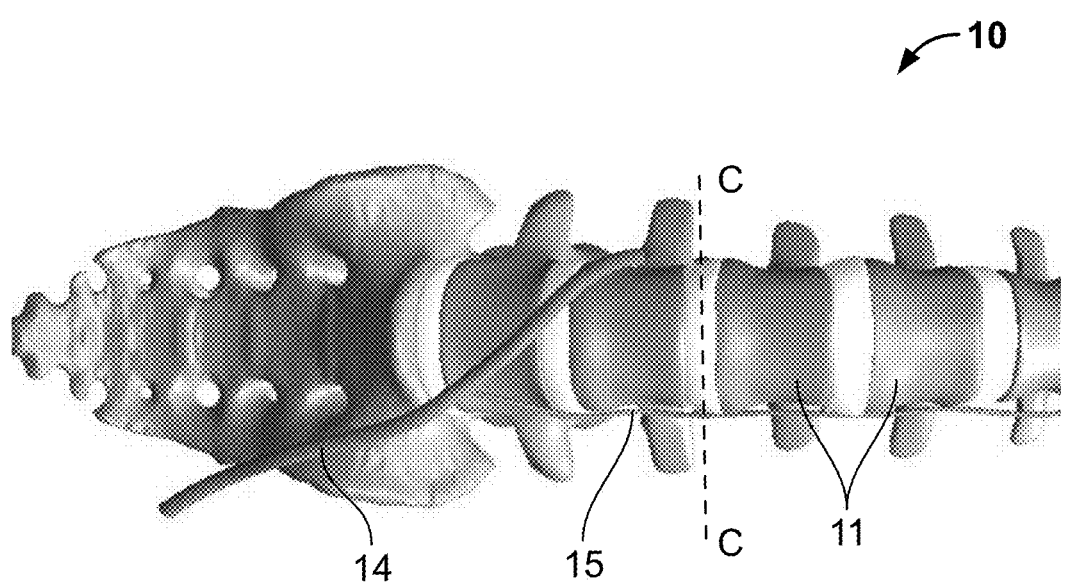
Figure 1C:
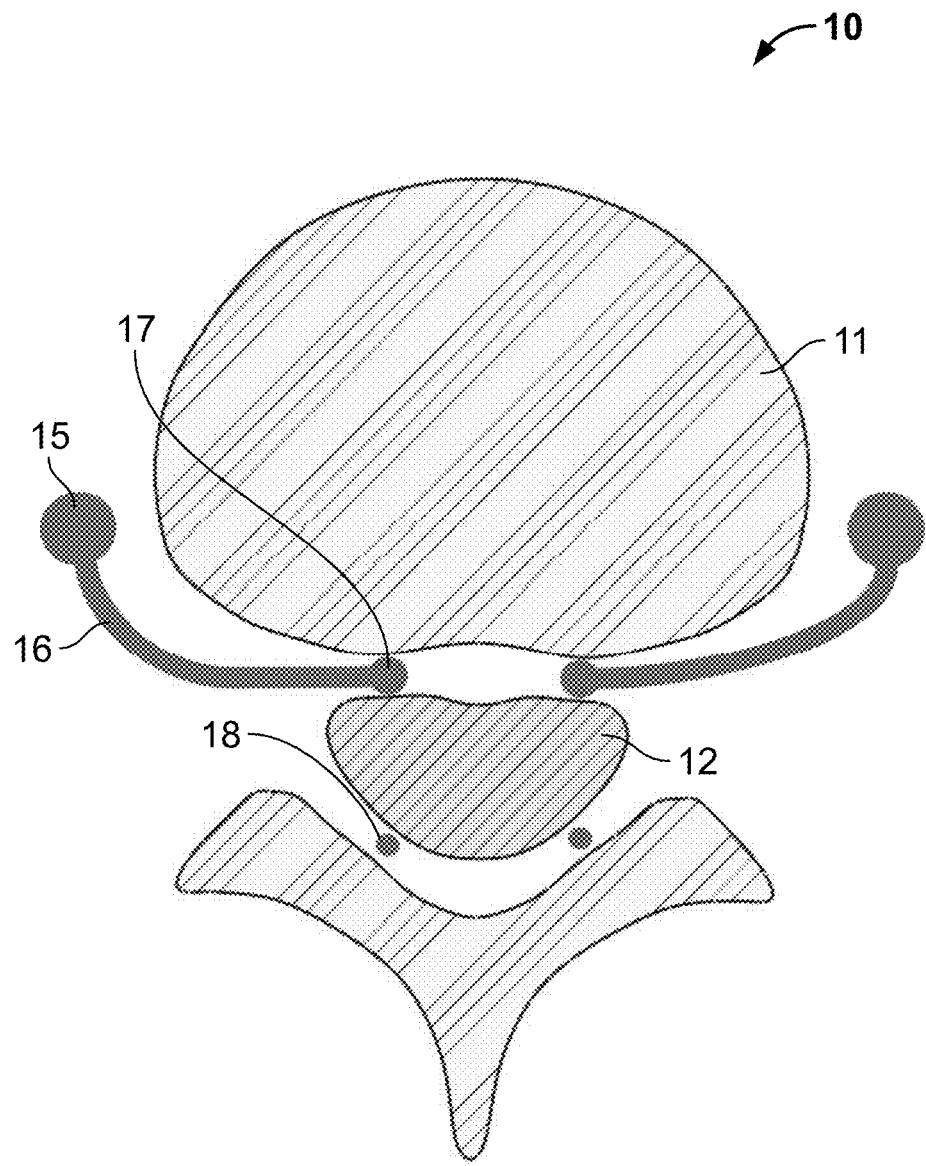

FIGS. 1A, 1B, and 1C illustrate different views of a patient's anatomy in the lumbar region 10. FIG. 1A is a semi-lateral view, FIG. 1B is an anterior view, and FIG. 1C is a cross-sectional view taken along the line C-C shown in FIG. 1B. The lumbar region 10 includes vertebral bodies 11, thecal sac 12, foramen space 13, iliac vein 14, ascending lumbar vein 15, intervertebral veins 16, anterior venous plexus 17, and posterior venous plexus 18. Together, the iliac vein 14, ascending lumbar vein 15, intervertebral vein 16, anterior venous plexus 17, and posterior venous plexus 18 form a portion of the venous system 20. Together, the anterior venous plexus 17 and posterior venous plexus 18, with their anastomoses, form the epidural venous plexus 19.

The intervertebral veins 16 originate from the ascending lumbar vein 15, and the intervertebral veins 16 take an inward (medial) sweeping path of approximately 90° around the exterior surface of the vertebral body 11, thereafter entering the internal spinal column area through the foramen space 13. Through the foramen space 13, the intervertebral veins 16 join into the epidural venous plexus 17 (only left anterior side depicted in FIG. 1A). At this juncture the intervertebral veins 16 and anterior epidural venous plexus 17 typically run between the posterior inner surface of the vertebral body 11 and the thecal sac 12. Note, the epidural venous plexus 19 runs along interior region of the right, left, anterior and posterior sides of the vertebral bodies 11 with the anterior epidural venous plexus 17 being connected to the posterior epidural venous plexus 18, which is not depicted in FIG. 1A, 1B, or 1C.

According to embodiments, and as described below, a CSF shunt 100 is implanted by an endovascular surgeon, where the shunt includes a shunt body 103 extending between an inlet 101 and an outlet 102. The inlet 101, after implantation, is positioned in an intradural location within the thecal sac 12. The outlet 102 is positioned in the venous system. The shunt body 103 extends through interstitial tissue between the venous system and the dura. The CSF shunt 100 drains CSF from the thecal sac 12 into the venous system, thereby reducing pressure of the CSF in the subarachnoid space. The CSF shunt 100 is implanted using a delivery system 120. For placement and insertion of a CSF shunt 100 or delivery system 120, accurate alignment and directional orientation in the venous system are important.

Figure 2A:
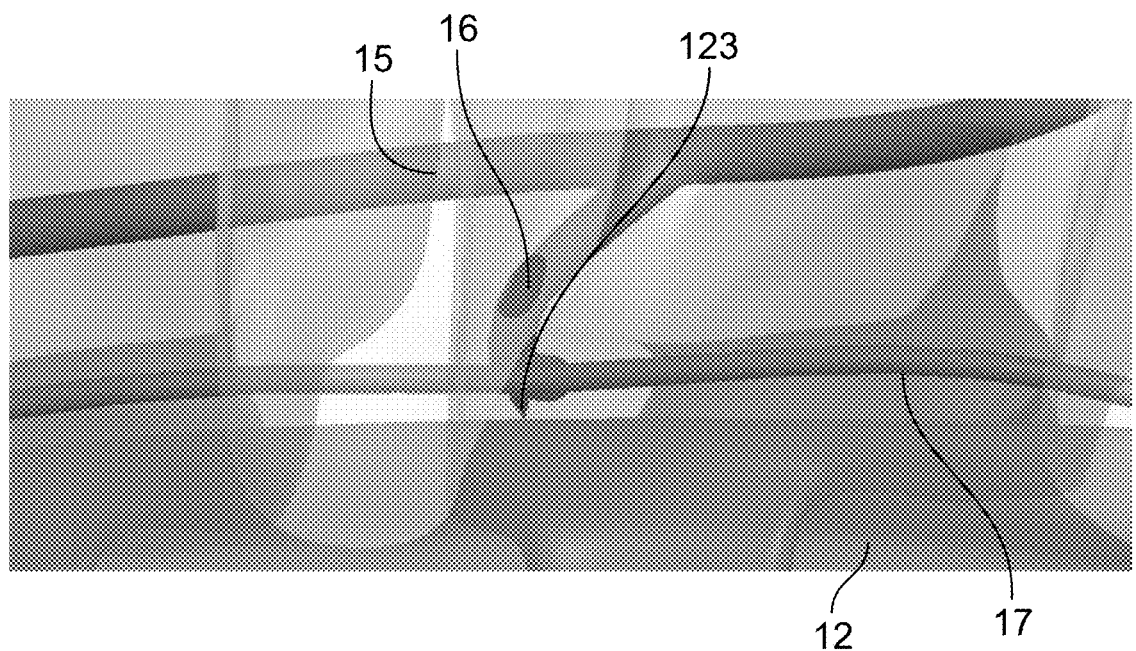
FIGS. 2A and 2B illustrate at one location in the foramen space illustrating how the intervertebral vein branches off the lumbar vein and joins into the epidural venous plexus 19.
Figure 2B:
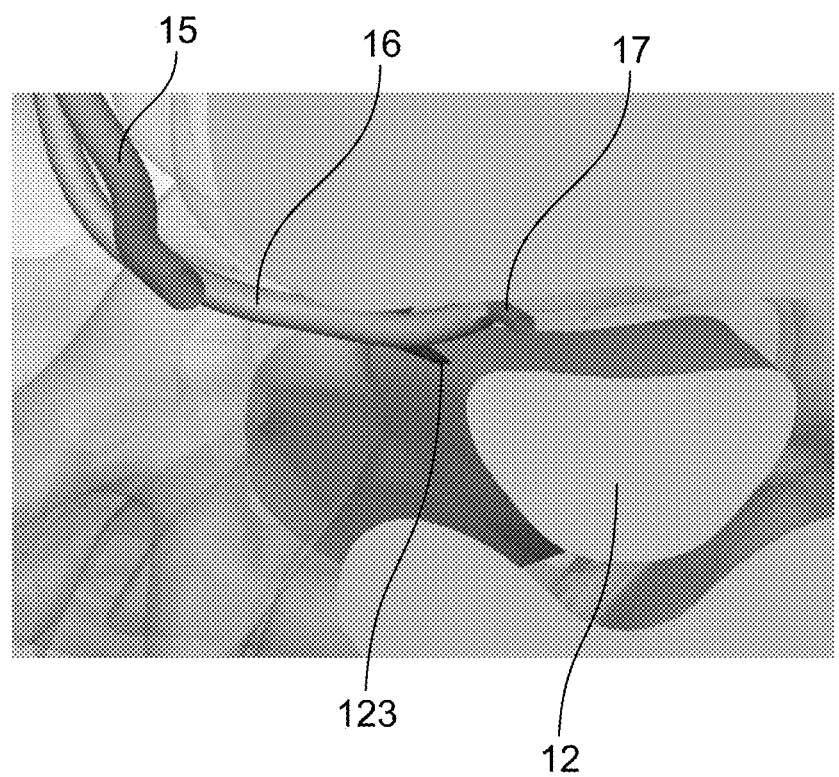

FIGS. 2A and 2B illustrate views (with FIG. 2B being a cross-sectional view) at one location in the foramen space 13 illustrating how the intervertebral vein 16 branches off the lumbar vein 15 and joins into the anterior epidural venous plexus 17 (posterior epidural venous plexus 18 not shown). FIG. 2A further depicts interstitial tissue 21 between the anterior epidural venous plexus 17 and the thecal sac 12.

A portion of a shunt delivery system 120, the stylet 123, (in one embodiment) is shown extending out of the distal intervertebral vein 16, and extending towards the thecal sac 12, through the interstitial tissue 21. The stylet 123 traverses through a vein wall, proximal to the junction of the intervertebral vein 16 and the anterior epidural venous plexus 17, and through the interstitial tissue 21 and is angled posteriorly towards the thecal sac 12. In another embodiment, not shown, the shunt delivery system 120, the stylet 123 can be advanced into the epidural venous plexus 19, for puncturing posterior into the thecal sac 12.

In order to advance the CSF shunt 100 and/or delivery system 120 through a wall in the venous system 20, interstitial tissue 21, and dura 22, and into the thecal sac 12, the delivery system 120 may provide for ways of transferring force supplied by the implanting surgeon to the CSF shunt 100 and/or the delivery system 120, this to aid in penetrating the tissues and spaces between the venous system 20 and into the thecal sac 12, further while maintaining flexibility in the shunt 100 and/or delivery system 120 to navigate the venous system 20. Embodiments facilitate the travel of the shunt 100 and/or delivery system 120 through the venous system 20, penetrate the interstitial tissue 21, and advance into the thecal sac 12.

Figure 3:
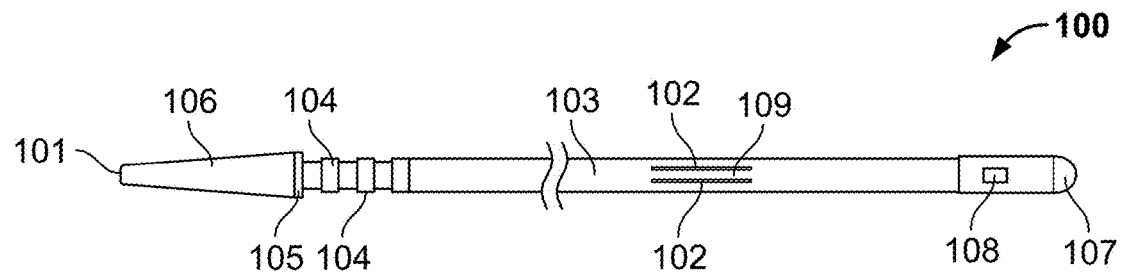
FIG. 3, which is a cross-sectional view, shows an embodiment of a CSF shunt.

FIG. 3, which is a cross-sectional view, shows an embodiment of a CSF shunt 100. The CSF shunt 100 includes an inlet 101, a shunt body 103, ribs 104, an abutment portion 105, a shunt head 106, a proximal seal 107, a radiopaque (RO) marker 108, and a flow regulator 109 having an outlet 102. When implanted, the inlet 101 (positioned in a distal region of the shunt head 106, such as the tip of the shunt head 106) is located in the thecal sac 12 and the outlet 102 is located in the venous system 20. The inlet 101 may be located on the shunt head 106. The inlet 101 is in fluid communication with the outlet 102, such that CSF can flow through the CSF shunt 100 from the thecal sac 12 into the venous system 20. The flow regulator 109 regulates the rate of flow of CSF through the CSF shunt 100. Exemplary embodiments of flow regulators 109 are disclosed in U.S. application Ser. No. 19/009,028, filed on Jan. 3, 2025, the entirety of which is incorporated by reference herein. The proximal seal 107 prevents CSF from flowing through the proximal end of the CSF shunt 100, and instead requiring that CSF exit through the outlet 102. In embodiments, the outlet 102 may be located at the proximal end (or proximate the proximal end) of the CSF shunt 100, and there may be no seal 107. While an RO marker 108 is shown at a proximal region of the CSF shunt 100, such an RO marker 108, or any suitable number of RO markers 108 may be located at suitable position(s) on the CSF shunt 100. The ribs 104 may secure the CSF shunt 100 to the dura 22 and/or interstitial space 21 upon implantation of the CSF shunt 100.

Figure 4:
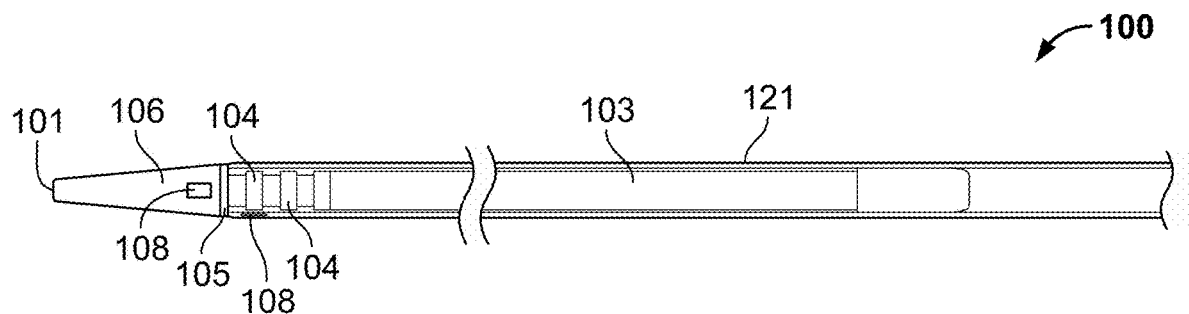
FIG. 4 shows a portion of a delivery system that sheathes at least a portion of the CSF shunt 100 prior to final in situ positioning, according to embodiments.

FIG. 4 shows a portion of a delivery system 120 (namely, a sheath 121) that sheathes at least a portion of the CSF shunt 100 prior to final in situ positioning. As further disclosed, the delivery system 120 can also include a guide catheter 122 and/or a stylet 123 (not shown in FIG. 4). The ribs 104, flow regulator 109, and/or proximal seal 107, may be sheathed by the sheath 121 during delivery and subsequently removed once the CSF shunt 100 is in its or near its final position. The sheath 121 includes a hollow interior region that can receive the shunt body 103. The sheath 121 can extend to the abutment portion 105, providing a transition from the shunt head 106 to the sheath 121. The abutment portion 105 against which a distal region of the sheath 121 abuts can transmit force from the sheath 121 to the CSF shunt 100 to advance the CSF shunt 100. The abutment portion 105 can include a ridge or other structure. The abutment portion couples the sheath to other portion(s) of the CSF shunt 100 (e.g., the shunt head 106) such that a force on the sheath 121 causes a force on the CSF shunt 100 to move both the sheath 121 and the CSF shunt 100. The conically shaped shunt head 106, exemplifying an embodiment, can assist in decreasing the force needed to penetrate tissues. The tapered design of the shunt head 106 achieves this by gradually dilating the tissues from tip to end following the formation of an incision (as will be further discussed). The shunt head 106 shape could be trocar shaped, or have another shape to modify the force necessary for insertion/dilation into tissues to be transversed. The shunt head 106 could also have sharp/blade components integrated into the design to further slice through tissue. The shunt head 106 could be coated with a lubricious material such as silicone, MDX, or constructed from a lubricious material such as PTFE or an impregnated PTFE in a polymer such as a medical grade urethane to further reduce resistance while pushing/penetrating/dilating the tissues. The sheath 121 can be relatively stiffer in the region proximate to where it interfaces with the shunt head 106 (e.g., via the abutment portion 105) and maintain more flexibility in the proximal region of the delivery system 120 to help navigate the venous system 20. Radiopaque marker(s) 108 may be provided on or in the shunt head 106, distal region of the sheath 121, and/or ribs 104.

Figure 5A:
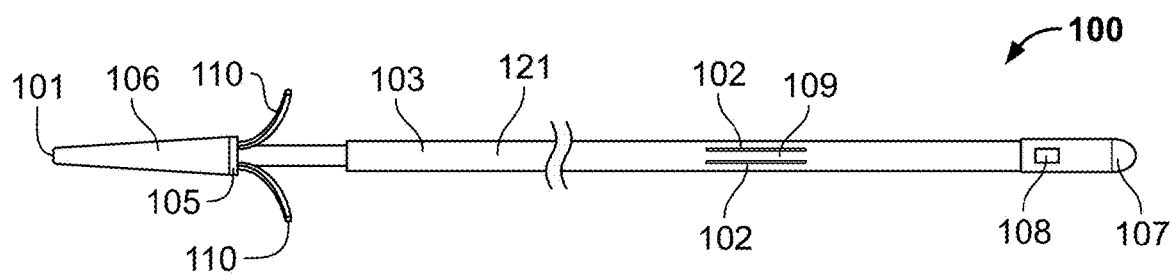
FIGS. 5A and 5B show different views of a CSF shunt, according to embodiments.
Figure 5B:
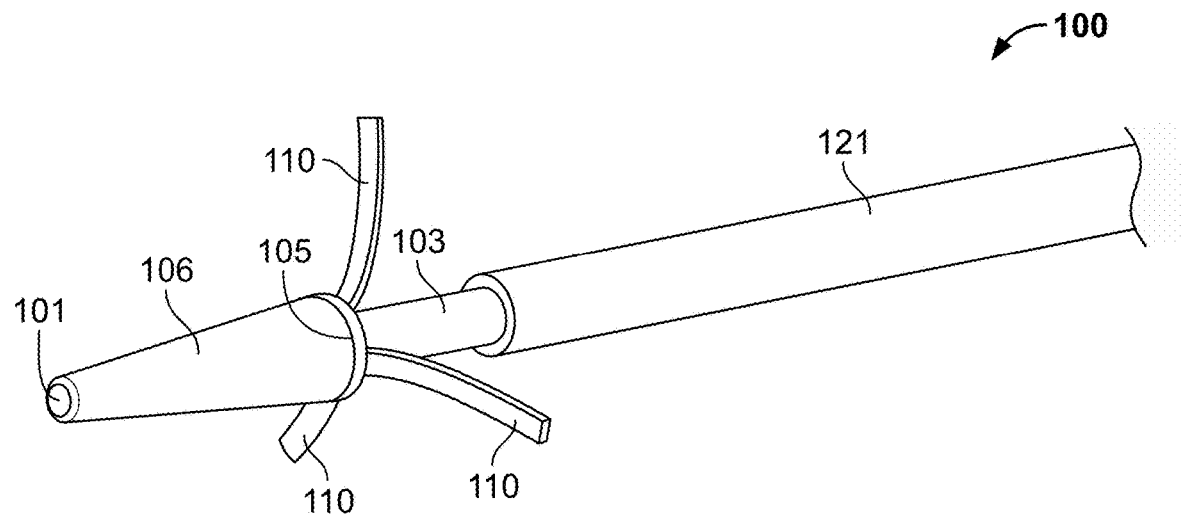

FIGS. 5A and 5B show different views of a CSF shunt 100 similar to the one disclosed in FIG. 3. Instead of ribs 104, however, the CSF shunt 100 embodiment of FIGS. 5A and 5B includes a plurality of tines or wings 110. The tines/wings 110 may be sheathed by the sheath 121 during delivery of the CSF shunt 100. The tines/wings 110 may be springs, and may be compressed when sheathed by the sheath 121. When the sheath 121 is removed, the tines/wings 110 can decompress. The tines/wings 110 (like the ribs 104) may secure the CSF shunt 100 to the dura 22. The tines/wings 110 may be inserted into the thecal sac 12 and may decompress and sit against the interior wall of the dura 22.

Figure 6:
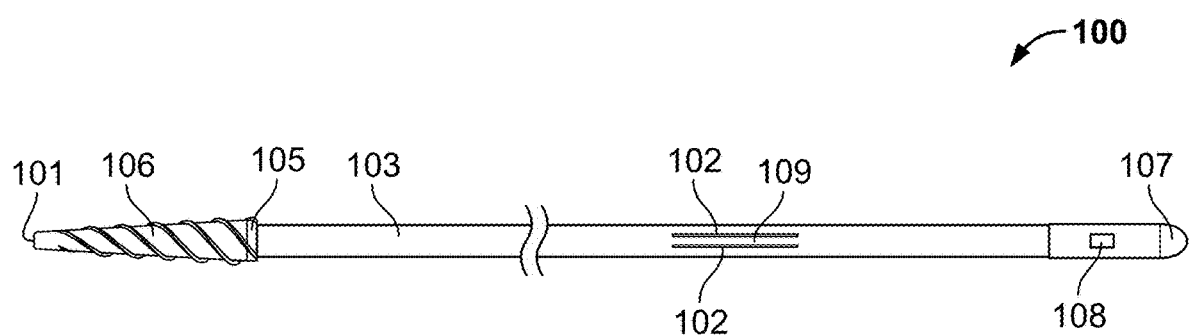
FIG. 6 shows an embodiment of CSF shunt.

FIG. 6 shows an embodiment of CSF shunt 100, where the shunt head 106 has screw threads or other similar type of feature that allow the shunt head 106 to be rotated or screwed to penetrate the dura 22, interstitial tissue 21, and/or wall in the venous system 20. While the shunt head 106 and other features or components of the CSF shunt and delivery system 120 are shown as being generally circular in cross-section, one or more of these features or components could be non-circular. For example, the shafts of components may be off-round to aid in navigating vessels.

In many of the figures, RO markers 108 (or locations therefor) are indicated. RO markers 108 could be positioned or embedded into any of the components of the CSF shunt 100 or delivery system 120 to indicate to the surgeon where given marked part(s) of the apparatuses or components are located during and at completion of an implantation procedure in an anatomical region. Such anatomical regions include intrathecal, intradural, interstitial, or intravascular regions.

Figure 7:
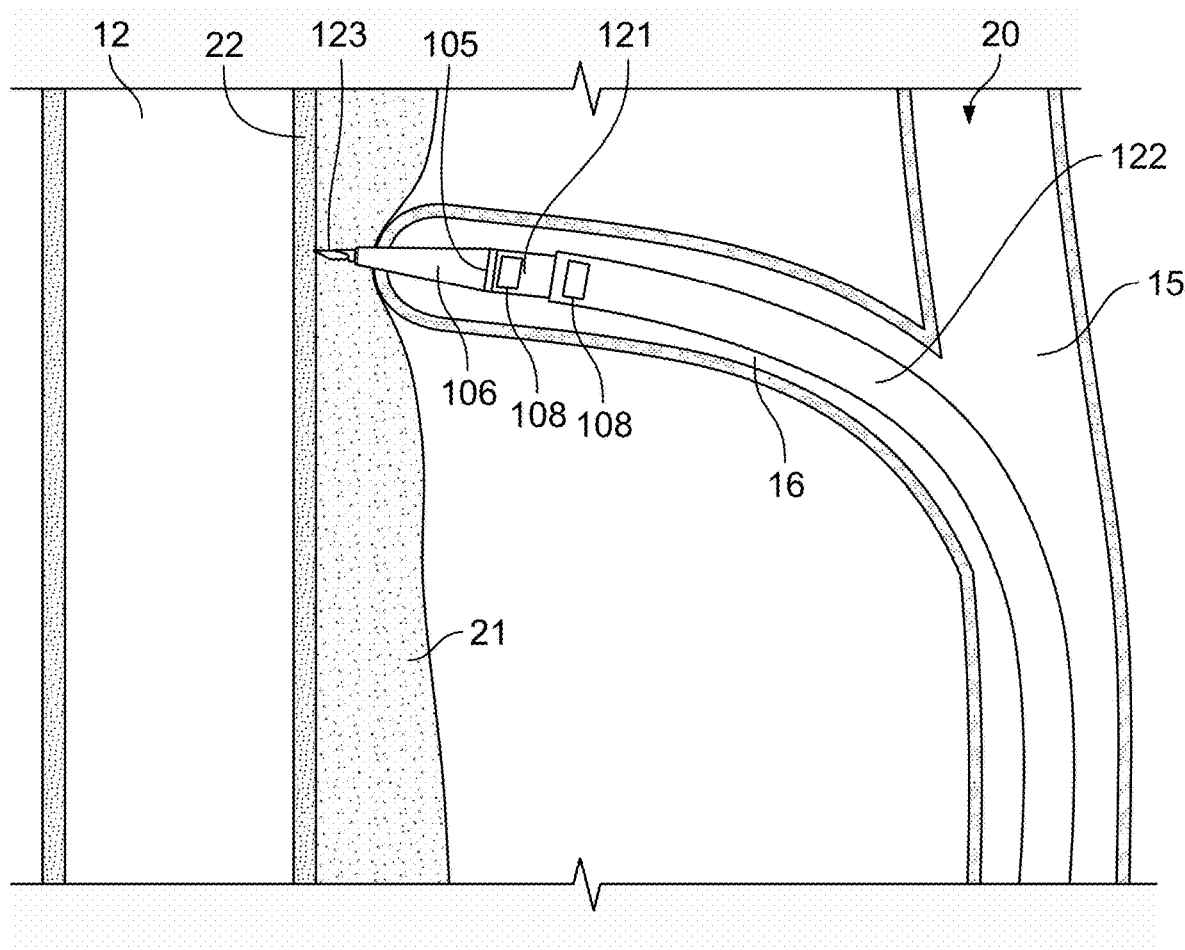
FIG. 7 illustrates an embodiment of the CSF shunt being implanted using the delivery system.
Figure 8:
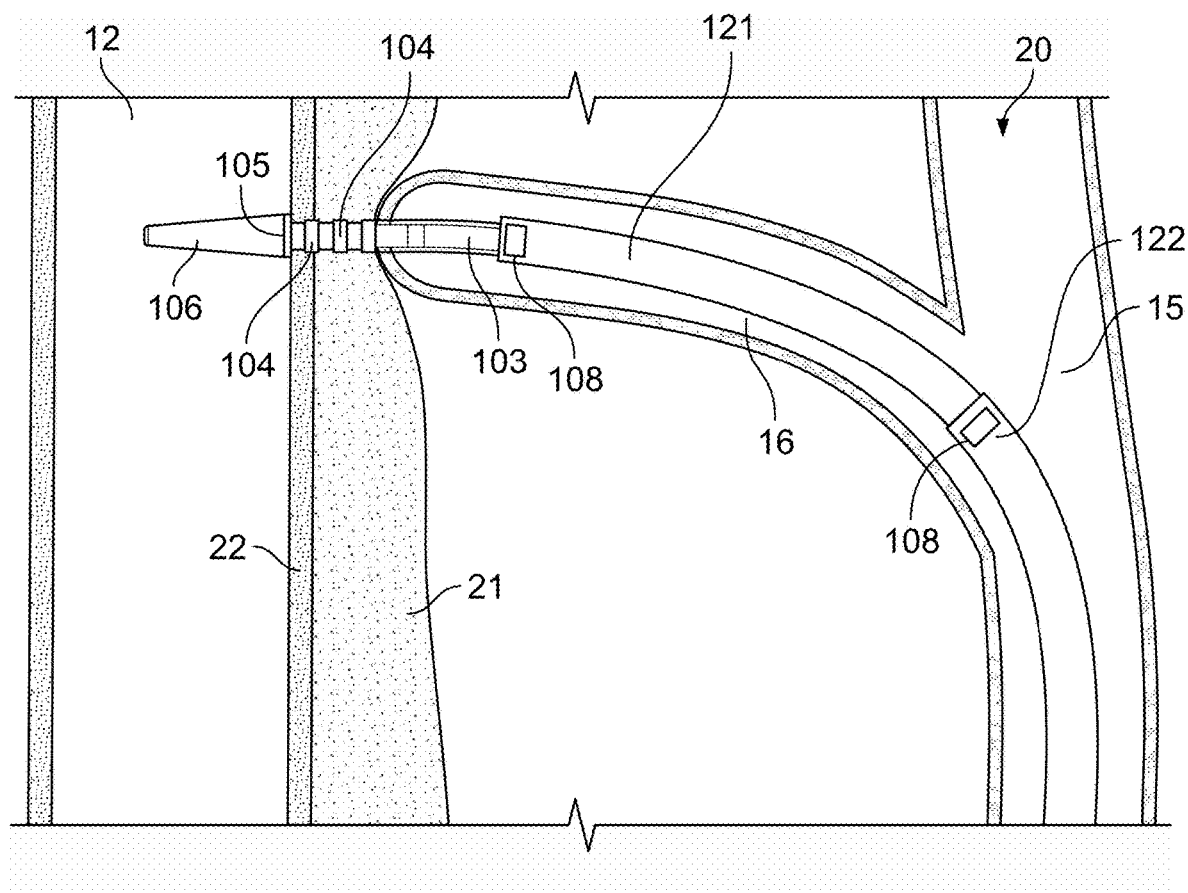
FIG. 8 illustrates one possible sequence for implanting the CSF shunt, according to embodiments.

FIGS. 7 and 8 illustrate an embodiment of the CSF shunt 100 being implanted using the delivery system 120. As shown in FIG. 7, the CSF shunt 100 (shunt head 106 is visible) is advanced through a guide catheter 122 and into the tissues prior to deployment. The sheath 121 can facilitate the transmission of force from the surgeon to the shunt head 106. This can occur before or after the stylet 123 has incised through a vein wall in the venous system 20 and interstitial tissue 21, eventually reaching and incising/puncturing the thecal sac 12. The shunt head 106, as it is pushed by the sheath 121, then dilates the tissues and reduces/inhibits tearing of the tissue behind the stylet 123 and penetrates through the tissues. Transition from the stylet 123 to the tip of the shunt 100 may be facilitated by a smooth dilating shape of the shunt head 106 that may maintain a smooth transition up to and over the sheath 121, this to reduce the force required to penetrate the dura 22 to enter the thecal sac 12. Prior to placement, the CSF shunt 100 and delivery system 120 can be advanced in unison (from the handle) through tissues and into the thecal sac 12 (e.g., they are an integral assembly for penetration). The sheath 121, while pushing the CSF shunt 100, may be advanced such that its distal end is in or even distal to the dura 22. After visual confirmation that the shunt head 106 is correctly located in the thecal sac 12 via RO markers 108 and/or contrast injection, the sheath 121 and/or guide catheter 122 can then be retracted. The stylet 123 can be retracted before the CSF shunt 100 is fully implanted or prior to full implantation (e.g., retracted once the dura 22 has been punctured and the shunt head 106 has begun to be inserted into the dura 22).

FIG. 8 further illustrates one possible sequence for implanting the CSF shunt 100 after the stylet 123 has incised/punctured the dura 22. As will be further discussed below, the CSF shunt 100 may be implanted across the dura 22, interstitial tissue 21, and vein wall by retracting the guide catheter 122, the sheath 121, the inner catheter 123, and proximal support catheter 125, thereby exposing the shunt body 103, ribs 104 and flow regulator 109 to the patient anatomy. After the tip of the CSF shunt 100 is advanced past the dura 22 and into the thecal sac 12, the CSF shunt 100 having been pushed by the sheath 121, the stylet 123 is withdrawn. This allows a channel from the thecal sac 12 through the shunt body 103 to the handle system controlled by the surgeon through which the surgeon can further confirm placement by either withdrawing CSF fluid, allowing CSF fluid to naturally drain and/or injecting a small amount of contrast into the thecal sac 12. The sheath 121 is then partially withdrawn to expose the ribs 104, and the system could be slightly pulled proximally to position the abutment portion 105 against the interior of the dura 22 and retain the CSF shunt 100 in the dura 22 and/or interstitial tissue 21 and/or intervertebral vein wall 15 via the ribs 104. Some of these steps can be performed in a different order, such as retracting the sheath 121, inner catheter 124, and/or proximal support catheter 125 before retracting the guide catheter 122, or retracting the sheath 121 and the guide catheter 122 in tandem. After placement confirmation, the guide catheter 122 can be withdrawn past the shunt body 103, the sheath 121 can then be withdrawn exposing the shunt body 103 to the patient's anatomy. Also shown in FIG. 7 is an inner catheter 124 which can also help/aid in the advancement/positioning of the CSF shunt 100, pushability thereof, and also protect the inner surface and the proximal seal 107 of the CSF shunt 100 during delivery. As explained and described below, there can be a proximal support catheter 125 to inhibit the CSF shunt 100 from moving retrograde during deployment.

The sheath 121 (which may be an external pushing catheter or EPC) may be temporarily mated to the CSF shunt 100 to help provide/enhance pushability, trackability, flexibility and to protect the CSF shunt 100 from kinking and/or bending during delivery/deployment, and/or to provide a lubricious/smooth surface for tracking through the guide catheter 122 and advancing/dilating through tissues to place the CSF shunt 100. The sheath 121 can be retracted to deploy/expose the CSF shunt 100. The sheath 121 may have an inner PTFE liner and/or embedded PTFE powder on the sheath 121 inner diameter (to decrease friction) to enhance movement/slideability when retracting the sheath 121. The sheath 121 may have braids/coils of variable patterns/pitches/thickness/materials or laser cut hypotube(s) embedded in the sheath 121 and/or durometer changes in the material along the shaft of the sheath 121. Such features may enhance pushability, trackability, flexibility, to achieve getting to a hard-to-access location and/or aid in transmitting force from the surgeon to the CSF shunt 100 and/or delivery system 120. The sheath 121 may be a multi-component item in which there is a flexible section covering the CSF shunt 100, a less flexible section distal to the CSF shunt 100, and a rigid shaft (steel, nitinol, polyimide tube) proximal to the CSF shunt 100 to increase pushability. These features or concepts may also apply to the inner catheter (IC) and the proximal support catheter (PSC), which will be discussed further.

The stylet 123 and shunt head 106 could be treated with a lubricant (e.g., MDX, Hydrophilic coating and/or the like) and/or coated to minimize the force required for incision to assist in tissue penetration. The shunt head 106 might be impregnated with PTFE or be made entirely out of PTFE to aid in reducing the force necessary to penetrate tissues in the foramen space 13. The shunt head 106 alternatively could be partially made with Pt/Ir (platinum-iridium alloy) and a polymer portion or other radiopaque metal. In addition, the shunt head 106 at one or more load bearing contact points could incorporate a locking feature to allow for the sheath 121 to attach to and detach from the shunt head 106. This feature may allow for the ability to retract the CSF shunt 100 before being fully deployed if the surgeon feels that there is an issue in placement of the CSF shunt 100. This feature could be applied/incorporated at any suitable location on the CSF shunt 100, and could integrate with one or more of the catheters disclosed herein.

As shown in FIGS. 4 and 7, the sheath 121 can abut the abutment portion 105. In such a way, the distal end of the sheath 121 is coupled (indirectly via the abutment portion 105) to the shunt head 106. This abutment location may be advantageous because it can allow for the sheath 121 to transfer force directly to the shunt head 106 during insertion, thereby potentially allowing for a more flexible/compliant proximal shunt body 103 and/or intricate flow regulation features. Thus, when the surgeon pushes the system CSF shunt 100 and delivery system 120 from the handle, the force is transmitted to the distal section (e.g., stylet 123) and shunt head 106. Smooth transitioning on the exterior of the stylet 123 to shunt head 106 to sheath 121 may facilitate penetration into the thecal sac 12 with reduced force.

Figure 9:
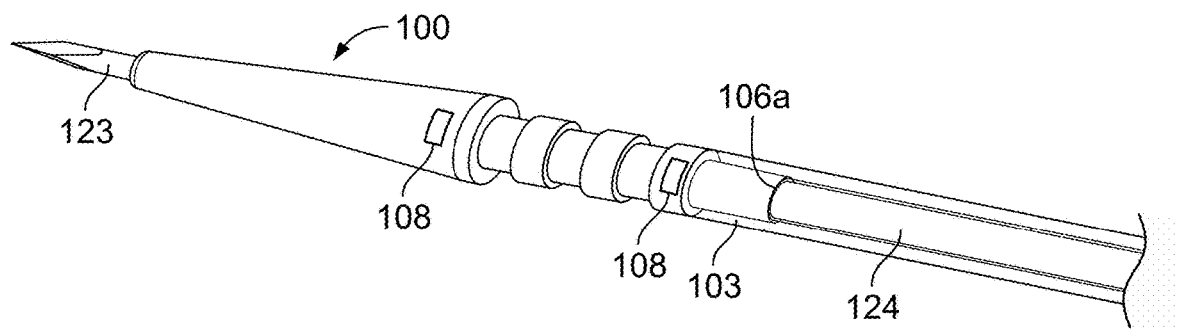
FIG. 9 depicts an embodiment of the delivery system.
Figure 10:
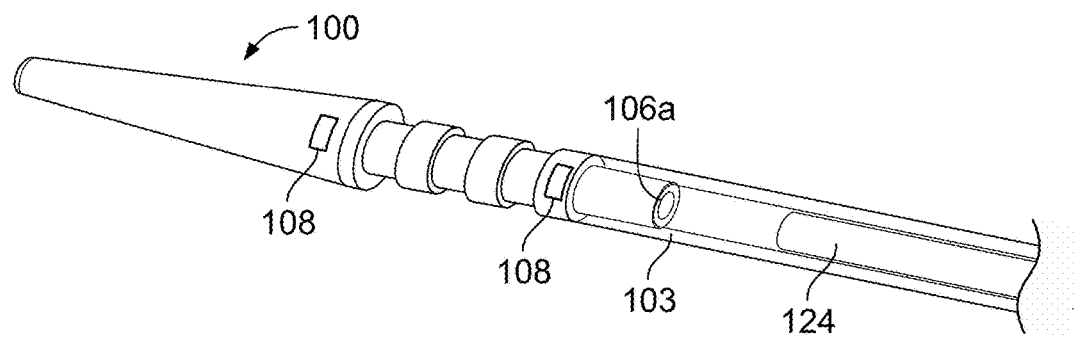
FIG. 10 illustrates an embodiment for deploying the CSF shunt.

FIG. 9 depicts an embodiment in which the delivery system 120 further includes an inner catheter 124. The shunt body 103 is shown as transparent for illustrative purposes. The internal catheter 124 (or a portion thereof) may be positioned within the CSF shunt 100 during implantation. The inner catheter 124 may provide additional aid in transmitting force to the shunt head 106 and/or stylet 123 from the surgeon operating the handle. To provide such aid, the inner catheter 124 may engage with a feature 106a in the shunt head 106 to transfer force from the inner catheter 124 to the CSF shunt 100. In addition, the inner catheter 124 may have a hollow interior region that provides a passage for the stylet 123 (or a portion thereof) and protect the CSF shunt 100 (e.g., shunt body 103) from being nicked, cut, and/or punctured by the stylet 123 during its withdrawal and/or placement. The inner catheter 124 may also aid in keeping the CSF shunt 100 coaxially aligned in the sheath 121 during deployment (e.g., the inner catheter 124 may inhibit CSF shunt 100 (e.g., shunt body 103) from being compressed and/or kinking/buckling during implantation). The inner catheter 124 may also act as a conduit for extracting CSF and or injecting contrast fluid to confirm placement. The inner catheter 124 may be connected to a luer and be an integrated part of the handle system. The inner catheter 124 may abut a feature on the shunt head 106. The inner catheter 124 could also contain a locking mechanism to attach to the CSF shunt 100 for retraction as explained above. The inner catheter 124 can also act as an internal guide lumen thus allowing the system to be advanced over a guidewire (as will be further explained). FIG. 10 illustrates an embodiment in which the inner catheter 124 has been retracted from the shunt head 106 after deployment and the stylet 123 has been removed.

Figure 11:
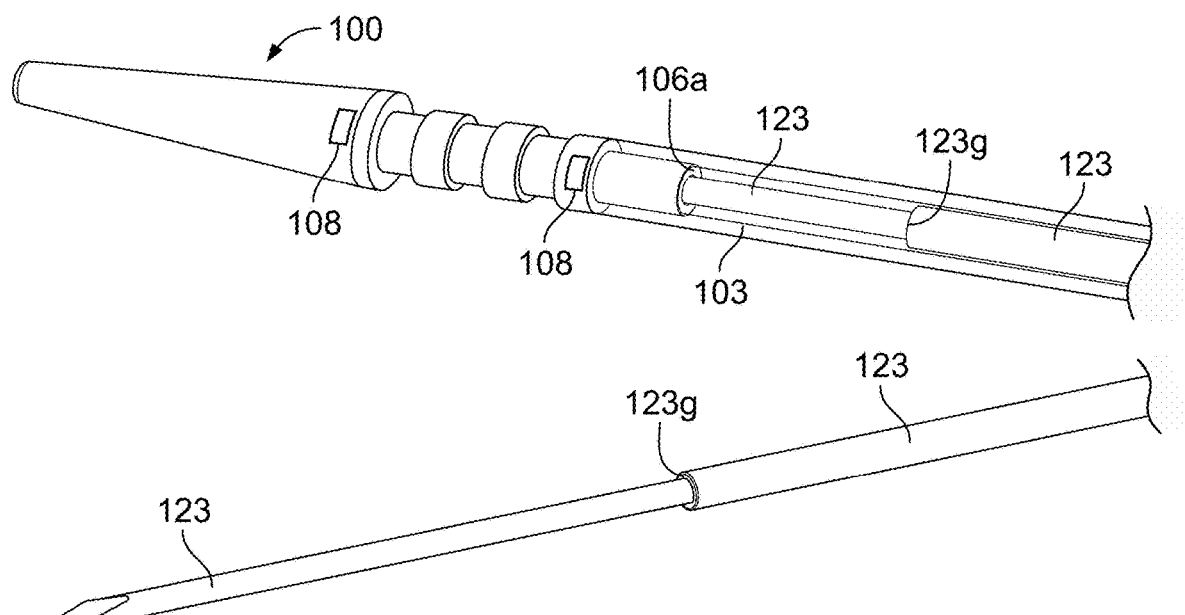
FIG. 11 illustrates an embodiment for deploying the CSF shunt.

FIG. 11 illustrates an embodiment without an inner catheter 124, in which the stylet 123 has a feature 123g that abuts with a corresponding feature 106a in the shunt head 106 when the stylet 123 is advanced forward. The feature 123g engages with the feature 106a to couple the stylet 123 to the shunt head 106 during advancement of the stylet 123 and the CSF shunt 100.

Figure 12:
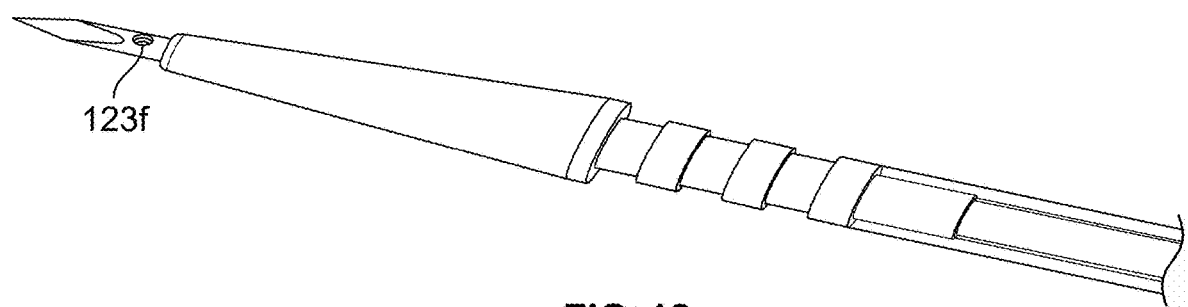
FIG. 12 illustrates an embodiment for deploying the CSF shunt.

FIG. 12 shows an embodiment with a variation of the stylet 123 in FIG. 11. As shown, the stylet 123 could have a hollow interior region. In the example shown, the stylet 123 may include a distal aperture 123f and a hollow interior region. In such a way, liquid can be flushed or aspirated through the distal aperture 123f through the stylet 123. The stylet 123 could also be configured as a non-coring hypodermic needle (not shown).

Figure 13A:
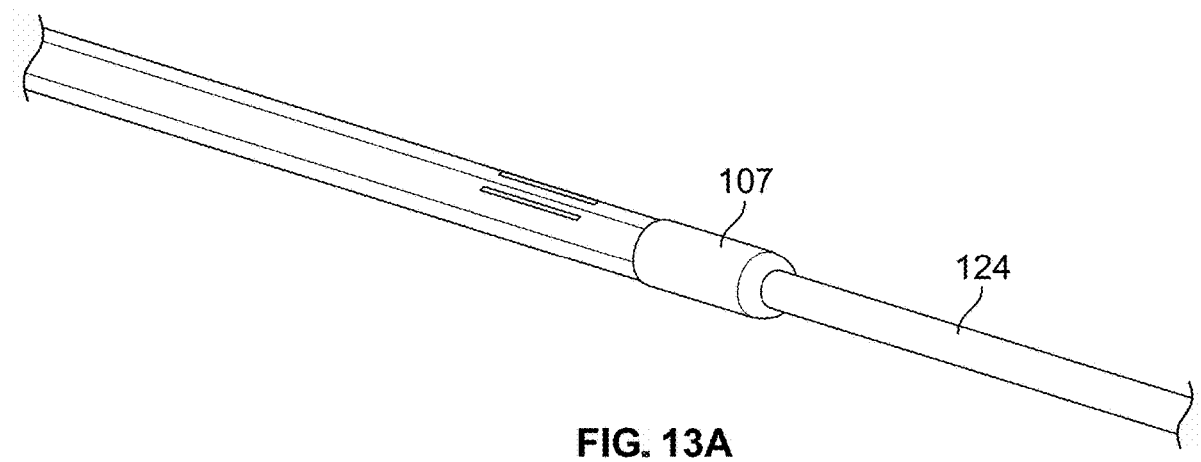
FIGS. 13A and 13B illustrate an embodiment for deploying the CSF shunt.
Figure 13B:
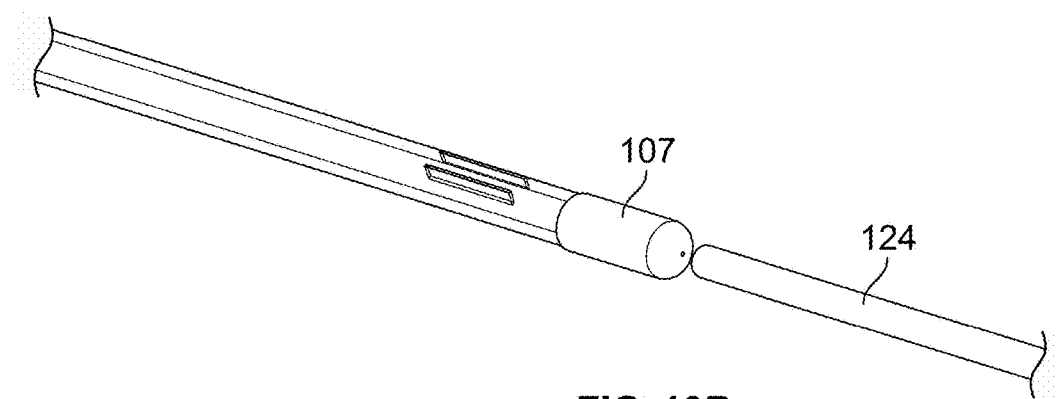

FIGS. 13A and 13B depict an embodiment in which the proximal seal 107 permits the inner catheter 124 and/or stylet 123 to pass into the shunt body 103 to facilitate placement of the CSF shunt 100 and to facilitate aspiration and/or flushing. As shown in FIG. 13A, the inner catheter 124 (and/or stylet 123) has been advanced through the proximal seal 107 and into the shunt body 103. As shown in FIG. 13B, when the inner catheter 124 (and/or stylet 123) is removed from the CSF shunt 100, the proximal seal 107 closes, thereby sealing the proximal end of the CSF shunt 100. The proximal seal 107 could also act as a flow regulator in cases where (due to high pressure) CSF needs to be drained more quickly than the flow regulator 109 can provide. In another configuration, the proximal seal 107 could also act as the primary flow regulator or the only flow regulator. The proximal seal 107 could be a separate component or it could be integral in the proximal end of the shunt body 103.

The proximal seal can be made of a relatively highly flexible/elastic polymer material such as a thermoplastic polyurethane or a silicone. The durometer of the material can be from 30 A to 90 A. The material properties and geometries can be selected so that the seal properly closes after delivery.

Figure 14A:
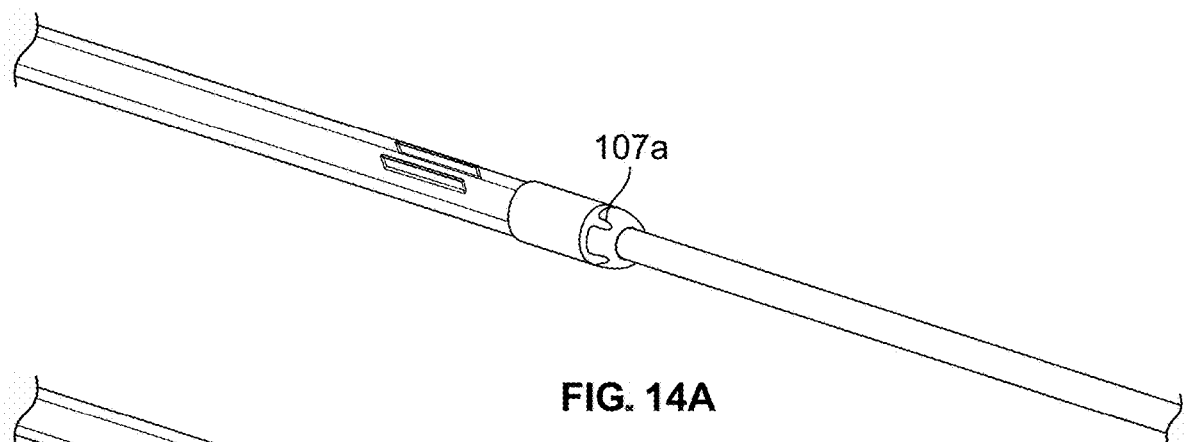
FIGS. 14A and 14B illustrate an embodiment of the proximal seal.
Figure 14B:
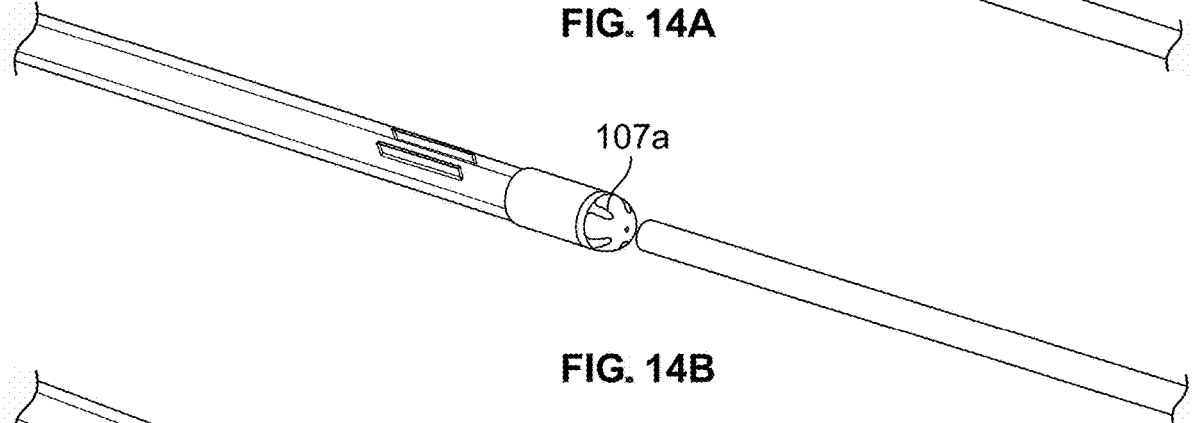
Figure 15A:
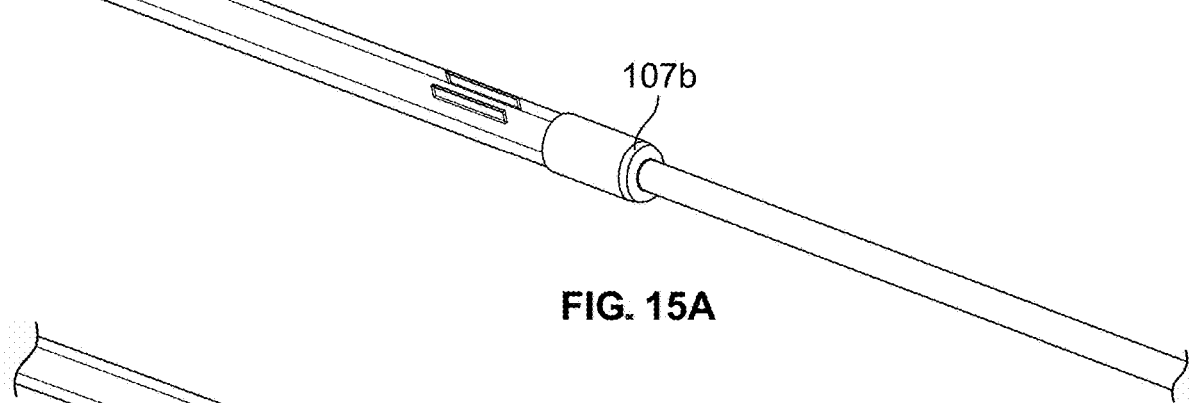
FIGS. 15A and 15B illustrate an embodiment of the proximal seal.
Figure 15B:
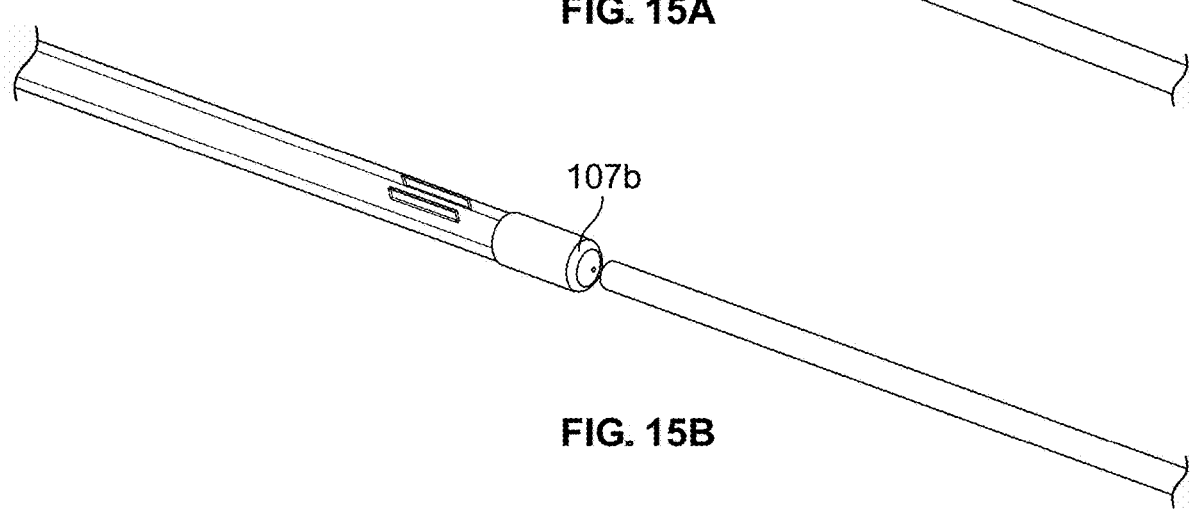

FIGS. 14A and 14B depict an embodiment of a proximal seal 107. The proximal seal 107 may have one or more spines or fingers 107a that act as springs (e.g., may have memory, as an example by using superelastic nitinol). The spines/fingers 107a may be situated on the exterior of the proximal seal 107, and/or may be embedded within the proximal seal 107. When the inner catheter 124 and/or stylet 123 is advanced into the CSF shunt 100 and through the proximal end 107, the spines/fingers 107a compress and exert a force on other portions of the proximal seal 107. When the inner catheter 124 and/or stylet 123 is removed out through an aperture in the proximal seal 107, the spines/fingers 107a decompress (fully or partially), thereby causing the hole in the end of the proximal seal 107 to close (fully or partially). The proximal seal 107 may inhibit retrograde flow from the venous system 20 to the thecal sac 12, e.g., from 0-50 cm H2O retrograde pressure. FIGS. 15A and 15B are similar to FIGS. 14A and 14B, respectively, except that instead of spines/fingers 107a, the proximal seal 107 includes a cinching ring 107b.

Figure 16A:
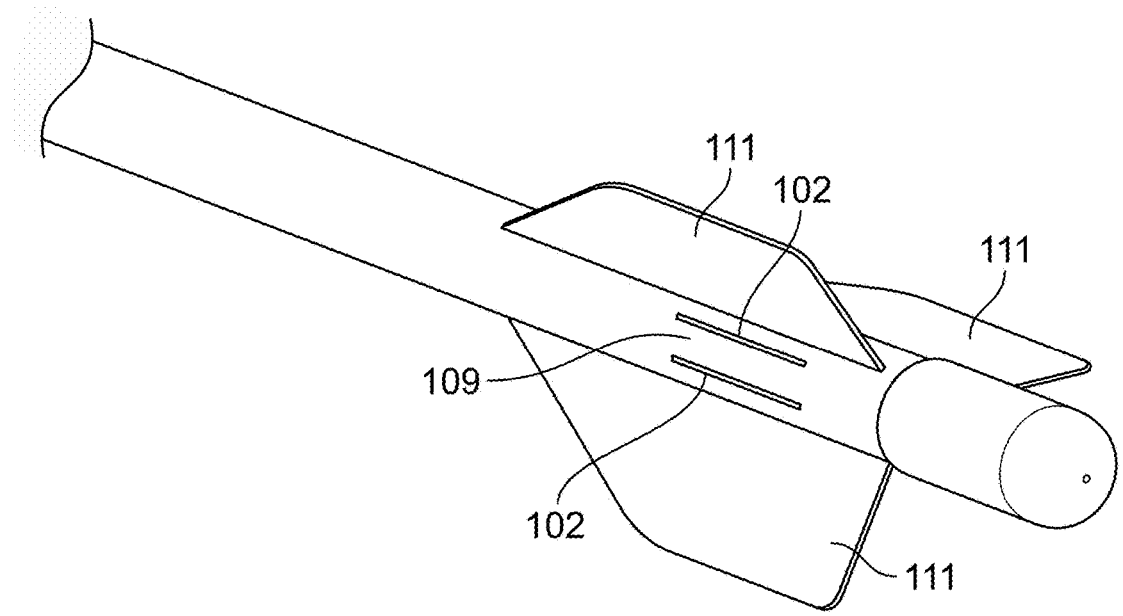
FIGS. 16A and 16B illustrate an embodiment of the CSF shunt with fins.
Figure 16B:
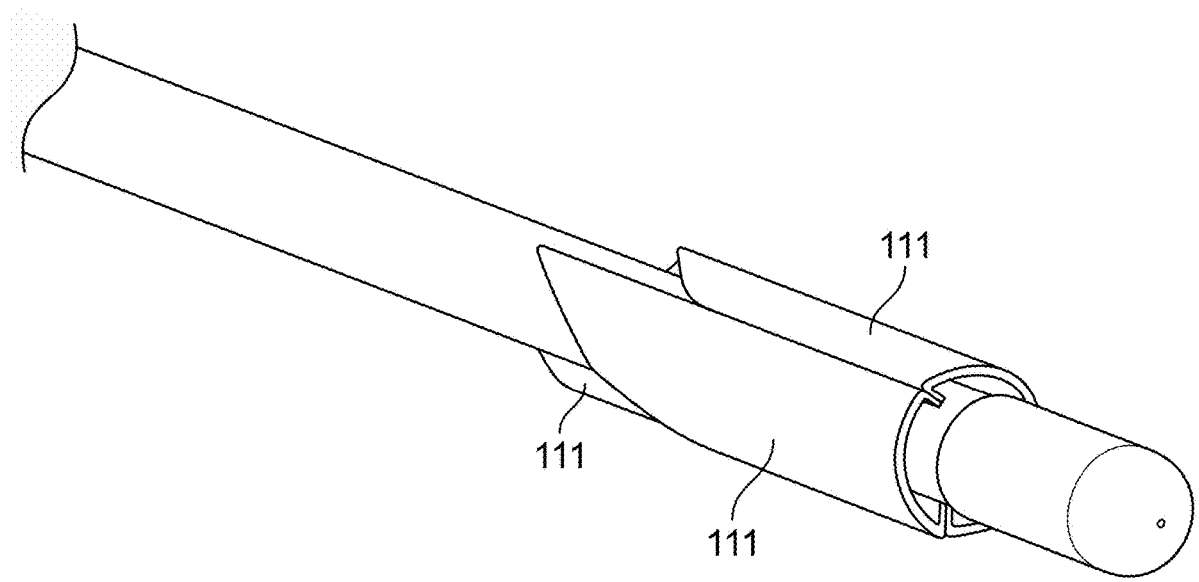

FIGS. 16A and 16B illustrate an embodiment of the CSF shunt 100 with fins 111. The proximal section of the shunt body 103 may couple to one or more elements (shown as fins 111) that promote separation of at least a portion of the flow regulator 109 and particularly its outlet(s) 102 and the vessel wall in the portion of the venous system 20 where the flow regulator 109 is located after implantation of the CSF shunt 100. FIG. 16A illustrates one example showing fins 111 that protrude out and tend to maintain the flow regulator 109 in the primary blood flow in a vein (e.g., central region of a vein). Aside from fins 111, such separation element(s) could include relatively thin and superelastic wires, nubs, or the like. The separation elements (e.g., fins 111) maintain at least a portion the flow regulator 109 out and away from a vessel wall such that the outlets 102 cannot become obstructed by the vessel wall. As shown in FIG. 16B, the fins 111 may be foldable such that the CSF shunt 100 may pass through the guide catheter 124 to reduce the inner diameter of the guide catheter 124 needed to transport the CSF shunt 100.

Figure 17:
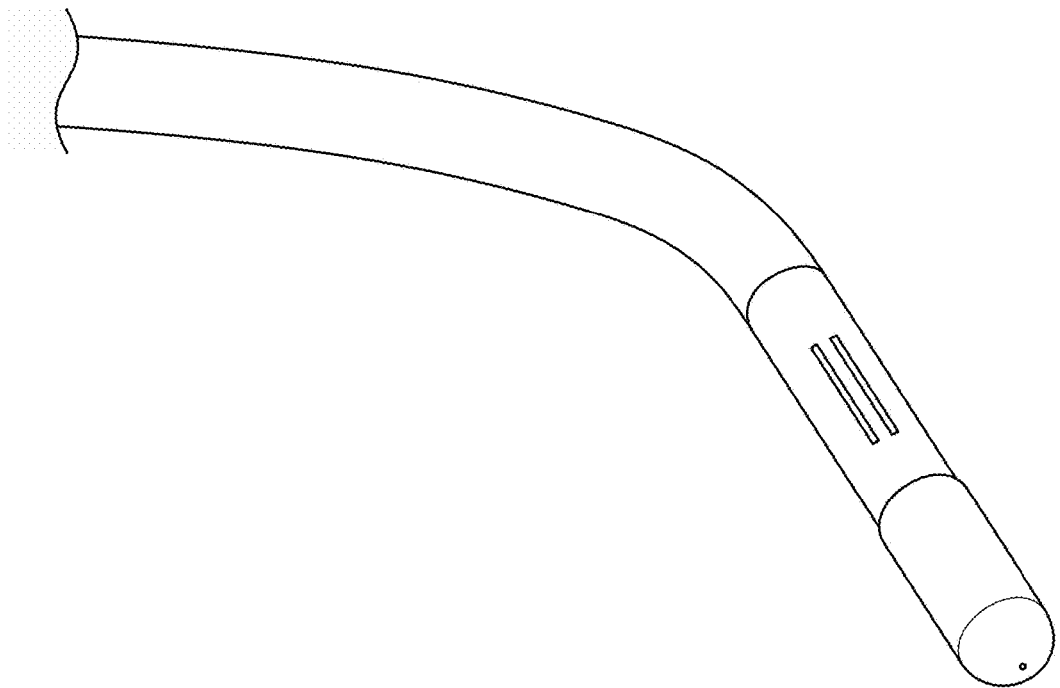
FIG. 17 illustrates an embodiment of the CSF shunt.

FIG. 17 illustrates another way maintain space between at least a portion of the flow regulator 109 (in particular the outlet(s) 102) from a vein wall. The proximal region of the shunt body 103 could be shaped in a non-linear manner—e.g., bent, S-shaped, coil-shaped, or the like. The outlet(s) 102 could be on the inside of a curve of the shunt body 103, and thus be maintained away from the vessel wall.

Figure 18A:
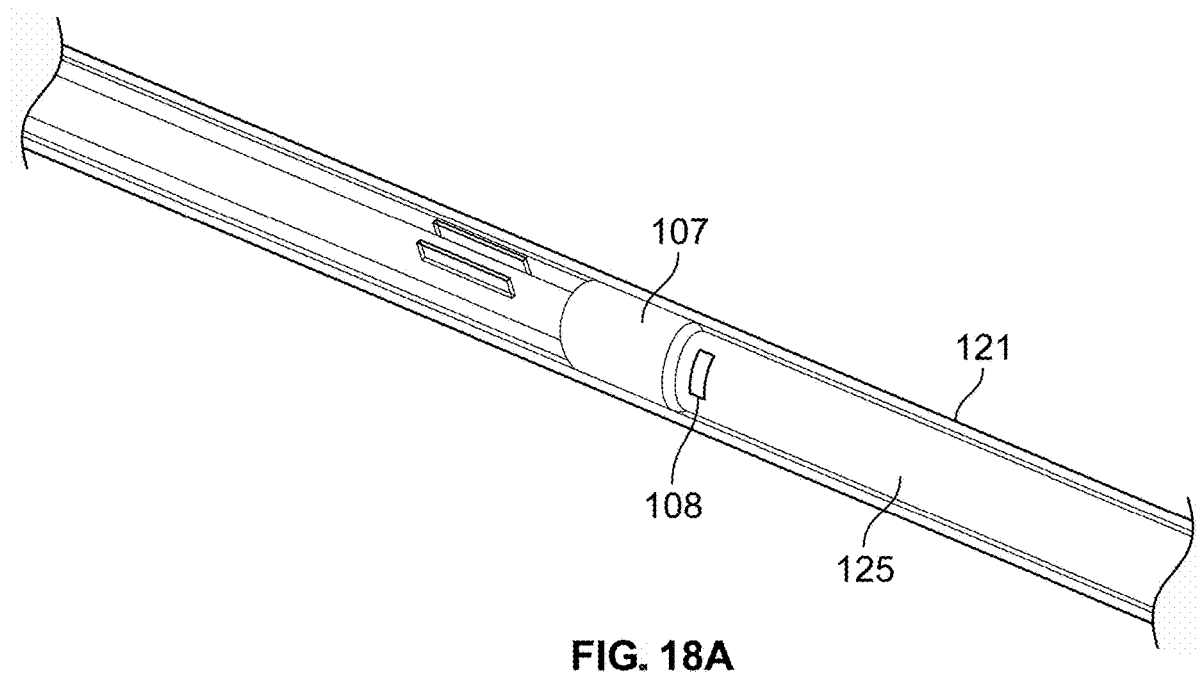
FIGS. 18A, 18B, and 18C illustrate the shunt delivery system, according to embodiments.
Figure 18B:
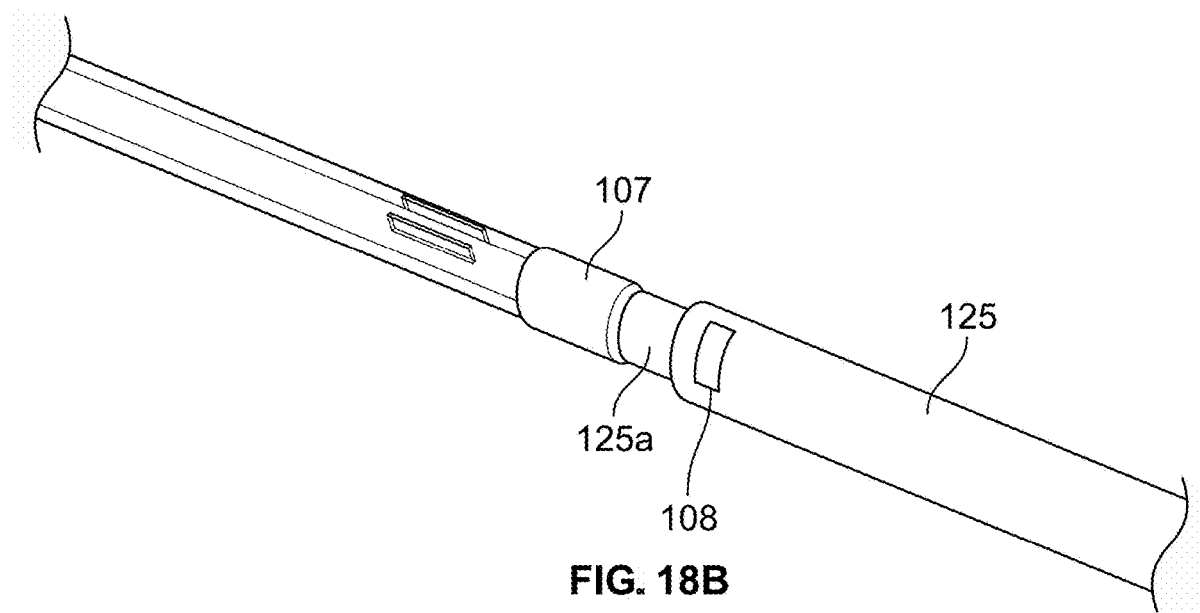
Figure 18C:
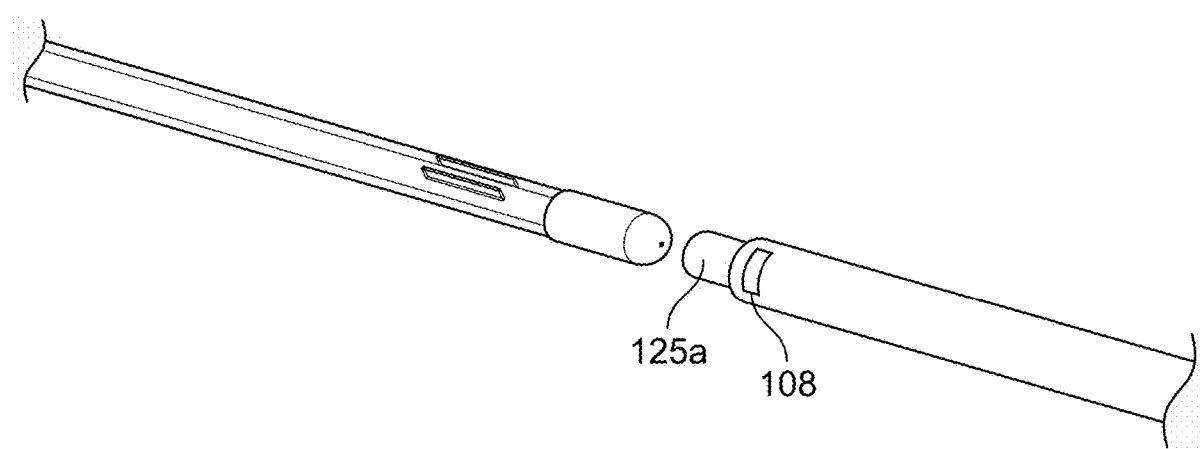

FIGS. 18A-18C illustrate a shunt delivery system 120 including a proximal support catheter 125 that assists in delivery of the CSF shunt 100, according to embodiments. Various forces during the implantation procedure of the CSF shunt 100 may cause it to move in a retrograde direction (i.e., towards the surgeon). Such forces may be caused by removal of the guide catheter 122, the sheath 121, the inner catheter 124, and/or the stylet 123. Some such retrograde movement may be undesirable as slowing down or preventing implantation of the CSF shunt 100. The proximal support catheter 125 may abut against the proximal end of the CSF shunt 100, thereby inhibiting retrograde movement of the CSF shunt 100. There can also be a retention mechanism to temporarily couple the proximal support catheter 125 to the proximal region of the CSF shunt 100 during delivery. In the shunt delivery system 120, and during delivery of the CSF shunt 100, the proximal support catheter 125 can be positioned over the inner catheter 124 and stylet 123, and further be positioned inside the sheath 121. The proximal support catheter 125 can reduce reliance on the shunt head 106 fixation features/component(s) (e.g., ribs 104) for support and fixation to the dura 22. Rather than depending solely on such fixation features, the proximal support catheter 125 can assist in stabilizing the CSF shunt 100 in place during retraction of the stylet 123, sheath 121, the inner catheter 124, and/or the guide catheter 122.

Using the proximal support catheter 125 to counteract retrograde shunt movement during the retraction of other system components can lessen the force required of the shunt anchoring systems (e.g., ribs 104) within the dura 22 and/or interstitial tissue 21 to stay moored in place after implantation of the CSF shunt 100. This can reduce the necessary retention force of the CSF shunt 100 anchoring in the dura 22 and/or interstitial tissue 21.

Additionally, the proximal support catheter 125 in conjunction with the inner catheter 124 and sheath 121 may facilitate the insertion of the CSF shunt 100 into its proper position. FIG. 18A illustrates the proximal support catheter 125 inserted via an insertion portion 125a (not visible in FIG. 18A, but shown in FIGS. 18B and 18C) into the CSF shunt 100 via the proximal seal 107. The proximal support catheter 125 may be hollow, thereby allowing passage of the stylet 123 and/or the inner catheter 124 through the interior of the proximal support catheter 125 and into or out of the CSF shunt 100 (e.g., shunt body 103).

After the CSF shunt 100 has been implanted, the proximal support catheter 125 may maintain pressure against the CSF shunt 100, thereby inhibiting retrograde movement. Such pressure may be maintained by the proximal support catheter 125 abutting the CSF shunt 100 (e.g., the proximal seal 107). Such pressure may also or alternatively be maintained by friction between the proximal seal 107 and the proximal support catheter 125, as the proximal seal 107 may include an elastic material and may have an aperture through which the insertion portion 125a passes, thereby expanding the elastic material and causing it to exert a friction force against the insertion portion 125a. With the proximal support catheter 125 inhibiting retrograde movement of the CSF shunt 100, the stylet 123 and/or inner catheter 124 can be removed proximally out of the CSF shut 100 and out through the proximal support catheter 125.

FIGS. 19A-19K illustrate a procedure for implanting the CSF shunt 100 using the shunt delivery system 120 that includes a transdural catheter 127, according to embodiments. According to this procedure, the transdural catheter 127 is placed transdurally before the CSF shunt 100 is implanted. The CSF shunt 100 is then conveyed at least partially through a hollow interior region of the transdural catheter 127 to implant the CSF shunt 100. As such, the CSF shunt 100 (or a portion thereof) is advanced through the transdural catheter 127 from the venous system 20, through the interstitial tissue 21, through the dura 22, and into the thecal sac 12.

Figure 19A:
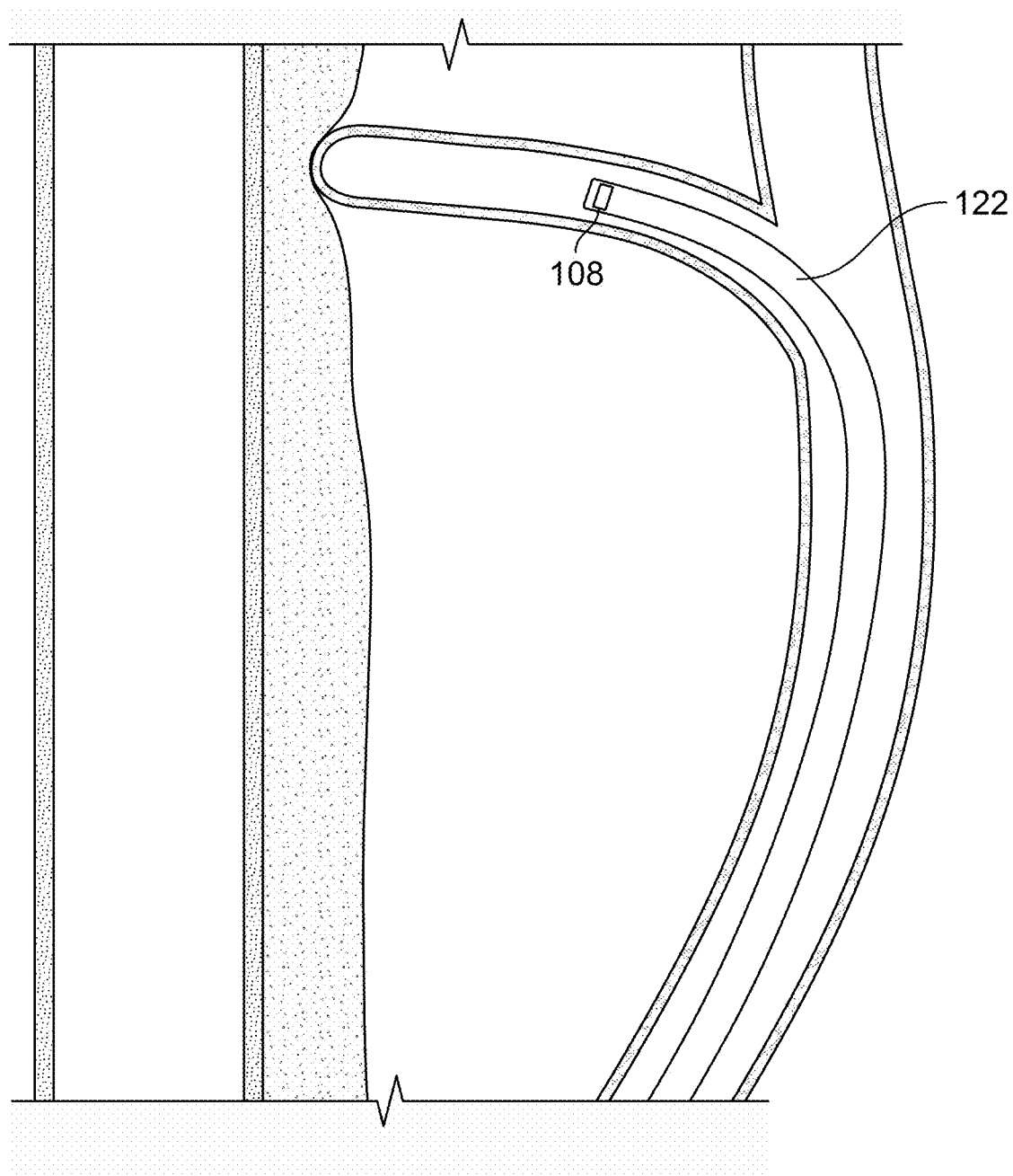
FIGS. 19A-19K illustrate a procedure for implanting the CSF shunt using the shunt delivery system, according to embodiments.
Figure 19B:
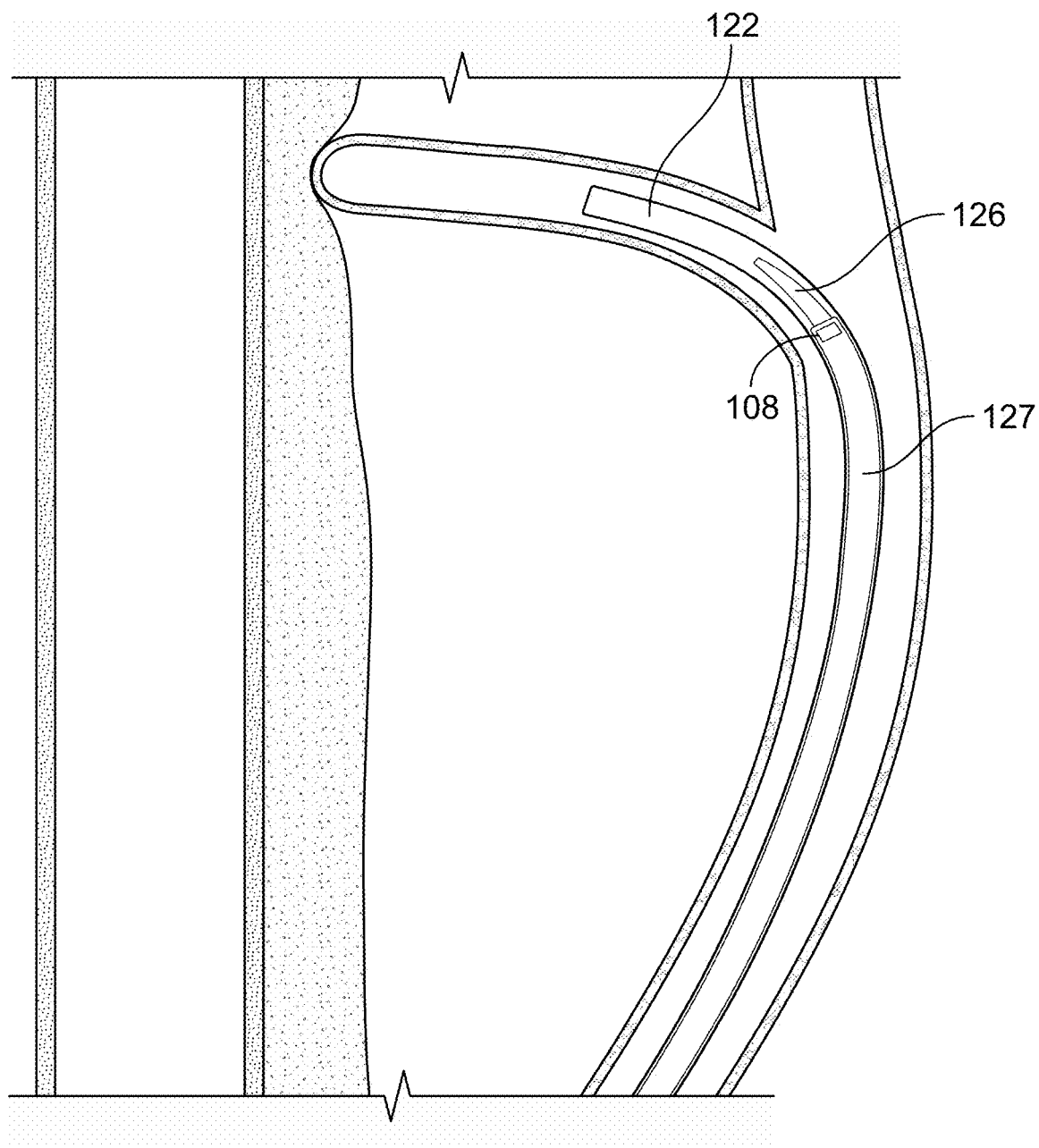
Figure 19C:
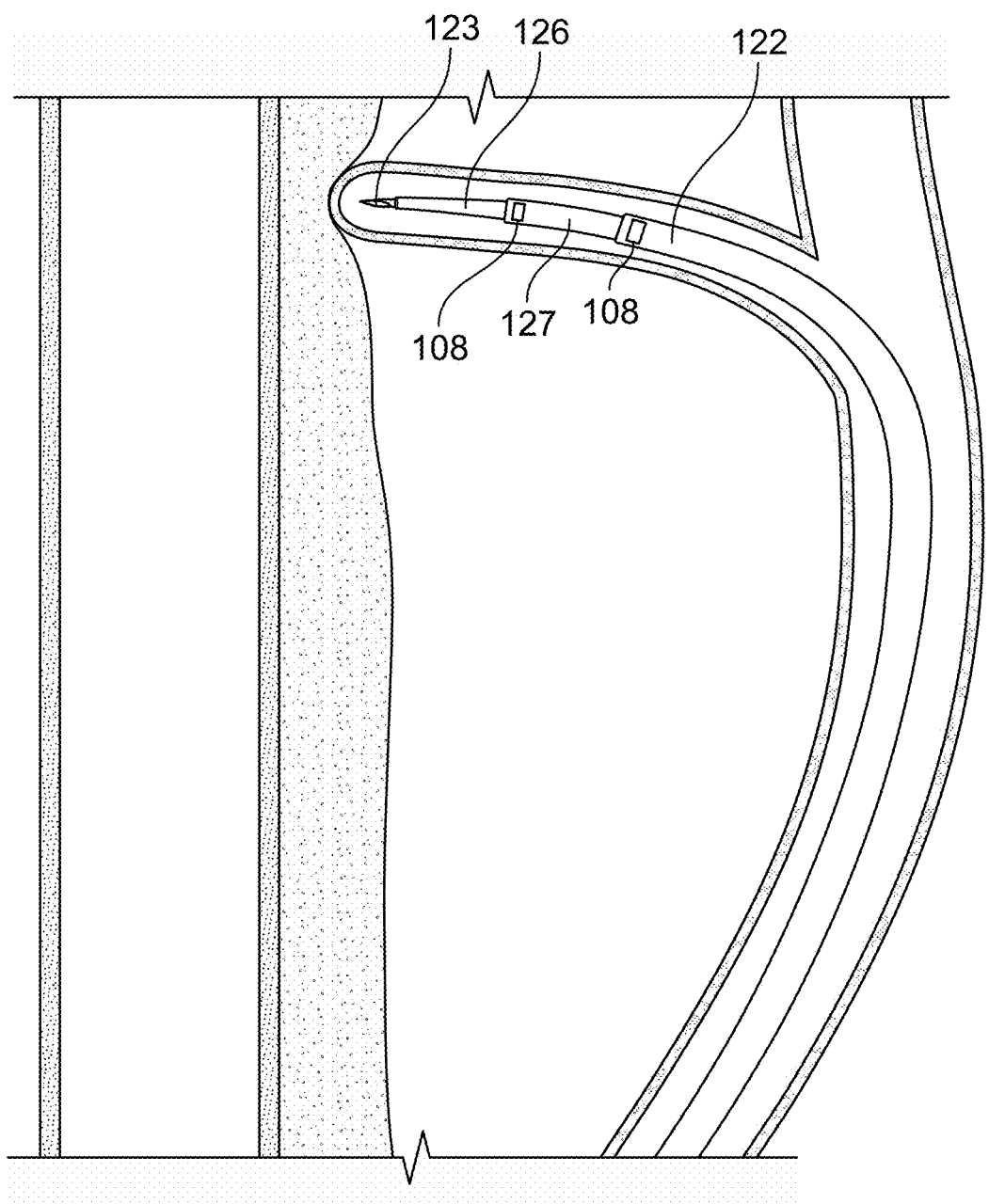
Figure 19D:
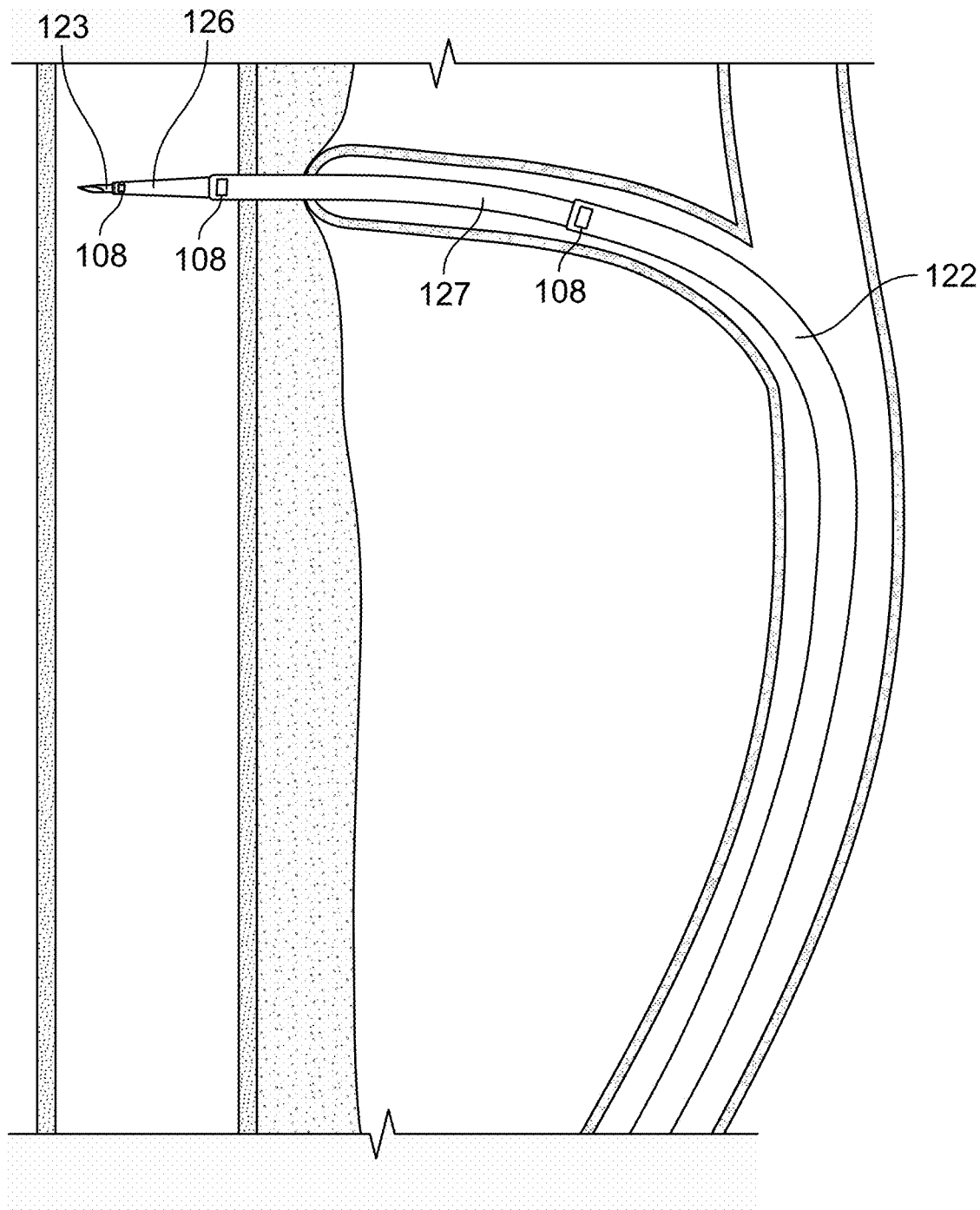

As shown in FIG. 19A, the guide catheter 122 is located in a suitable location in the venous system 20 (e.g., where the outlet of the guide catheter 122 is in an intervertebral vein 16. As shown in FIG. 19B, the guide catheter 122 is shown as transparent. The transdural catheter 127 along with a dilator 126 are fed into the guide catheter 122 and advanced. The transdural catheter 127 and dilator 126 could be temporarily coupled via a hub/handle mechanism on the proximal end of the catheters, or they could be independent catheters. Optionally, the transdural catheter 127 and dilator 126 can be moved together with the guide catheter during the procedure. The dilator 126 has a hollow interior region and an outlet on its distal tip. As shown in FIG. 19C, the transdural catheter 127 and the dilator 126 are advanced out of the guide catheter 122. The stylet 123 can be advanced through the dilator 126 and out of the distal tip of the dilator. As shown in FIG. 19D, the stylet 123 punctures the vein wall, the interstitial tissue 21, and the dura 22. The dilator 126 is advanced with or subsequent to the stylet 123 through the puncture. The dilator 126 dilates the tissue punctured by the stylet 123, such that the punctured tissue can accept the transdural catheter 127. The transdural catheter 127 is then advanced such that its distal tip is in the thecal sac 12. The stylet 123, dilator 126, and transdural catheter 127 can also advance through the system as one unit, coupled via a handle mechanism on the proximal end of the catheters. Radiopaque markers 108 on the transdural catheter 127 and/or the dilator 126 may be provided to allow for confirmation of placement of the transdural catheter 127 in the thecal sac 12.

Figure 19E:
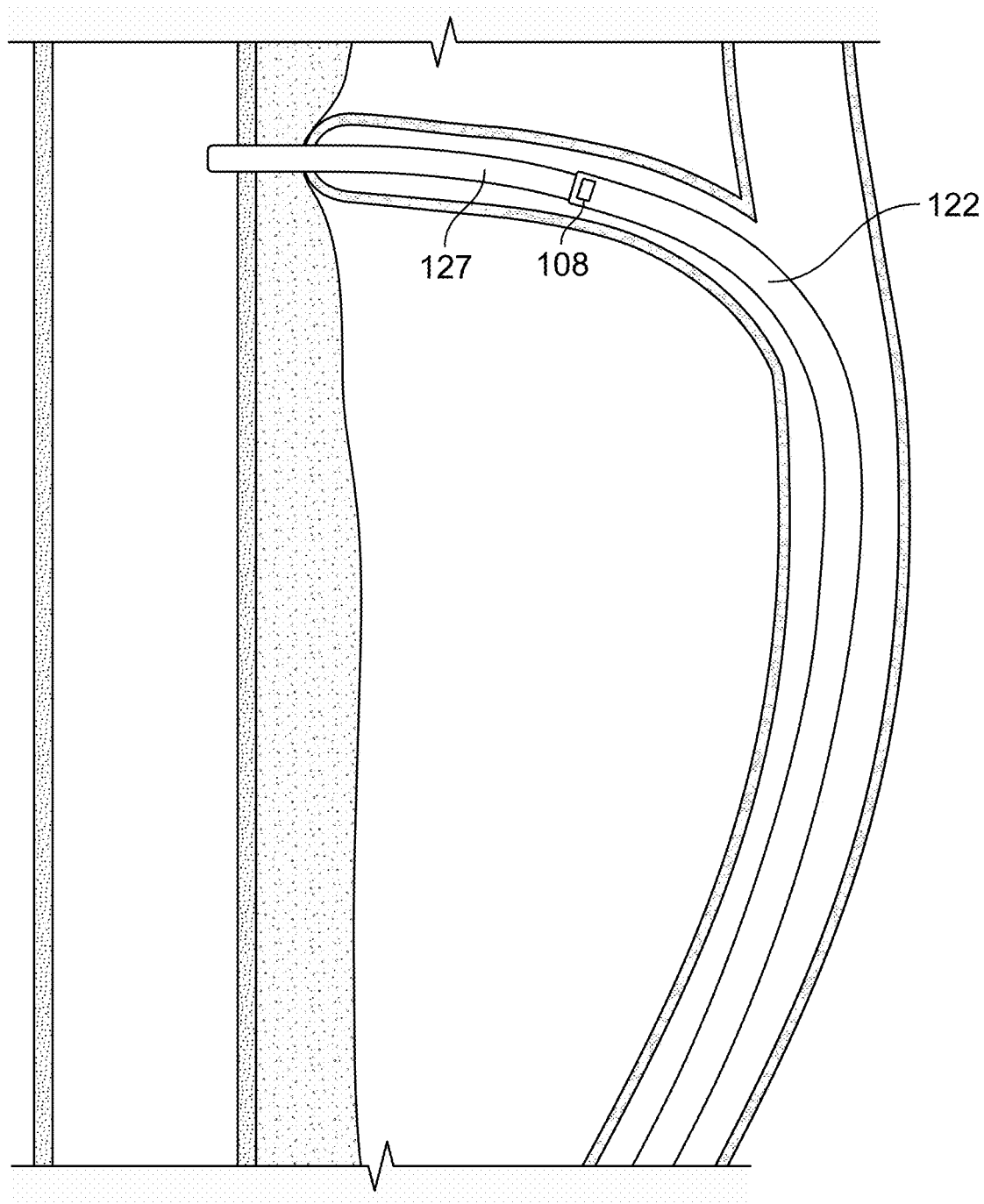

As shown in FIG. 19E, the dilator 126 and stylet 123 are retracted, leaving an open pathway into the thecal sac 12 along the interior of the transdural catheter 127. The stylet 123 may be retracted first, or the stylet 123 and dilator 126 may be retracted together. At this point the transdural catheter 127 can facilitate aspiration, contrast injection, and/or pressure measurement of the CSF pressure in the thecal sac 12.

Figure 19F:
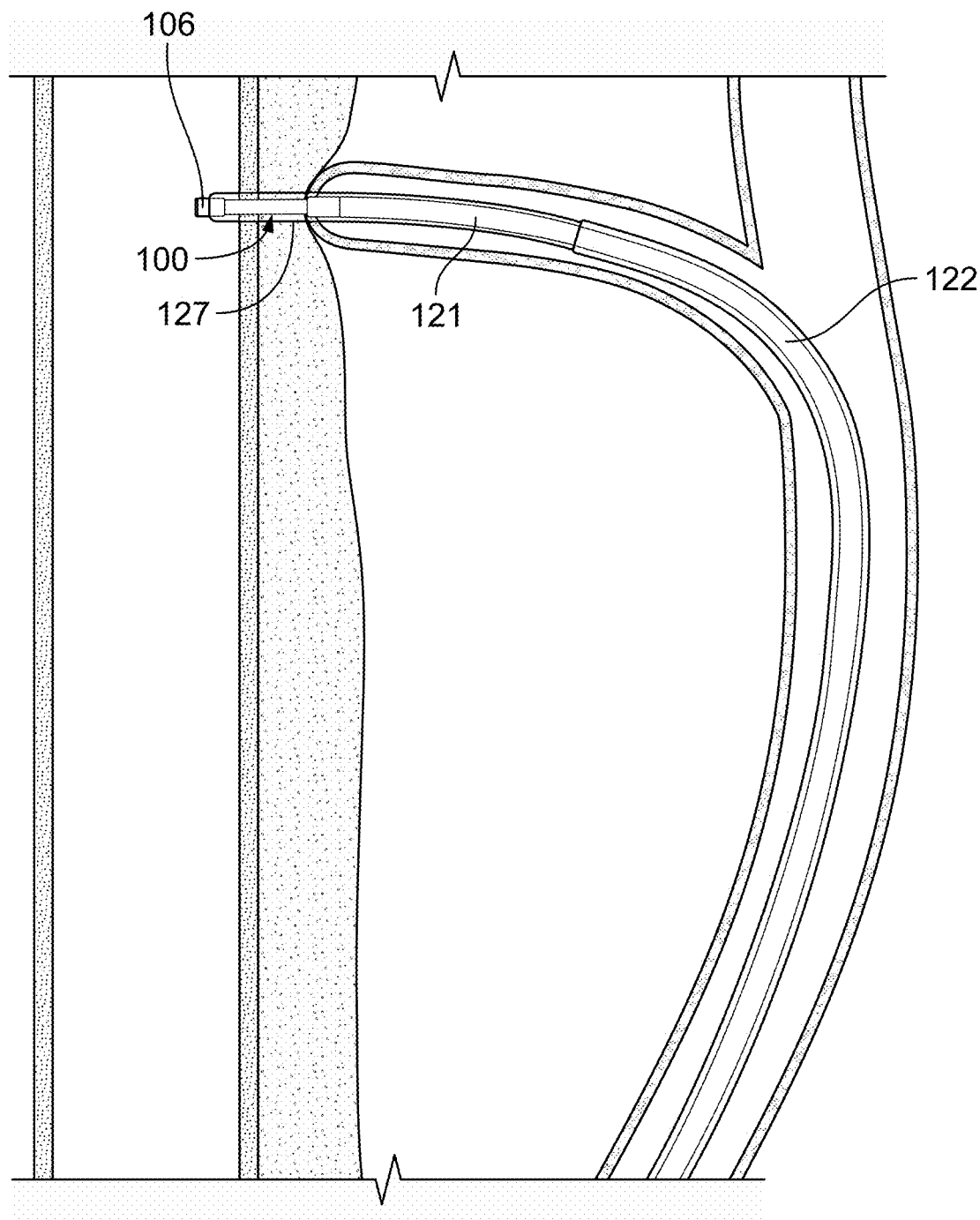
Figure 19G:
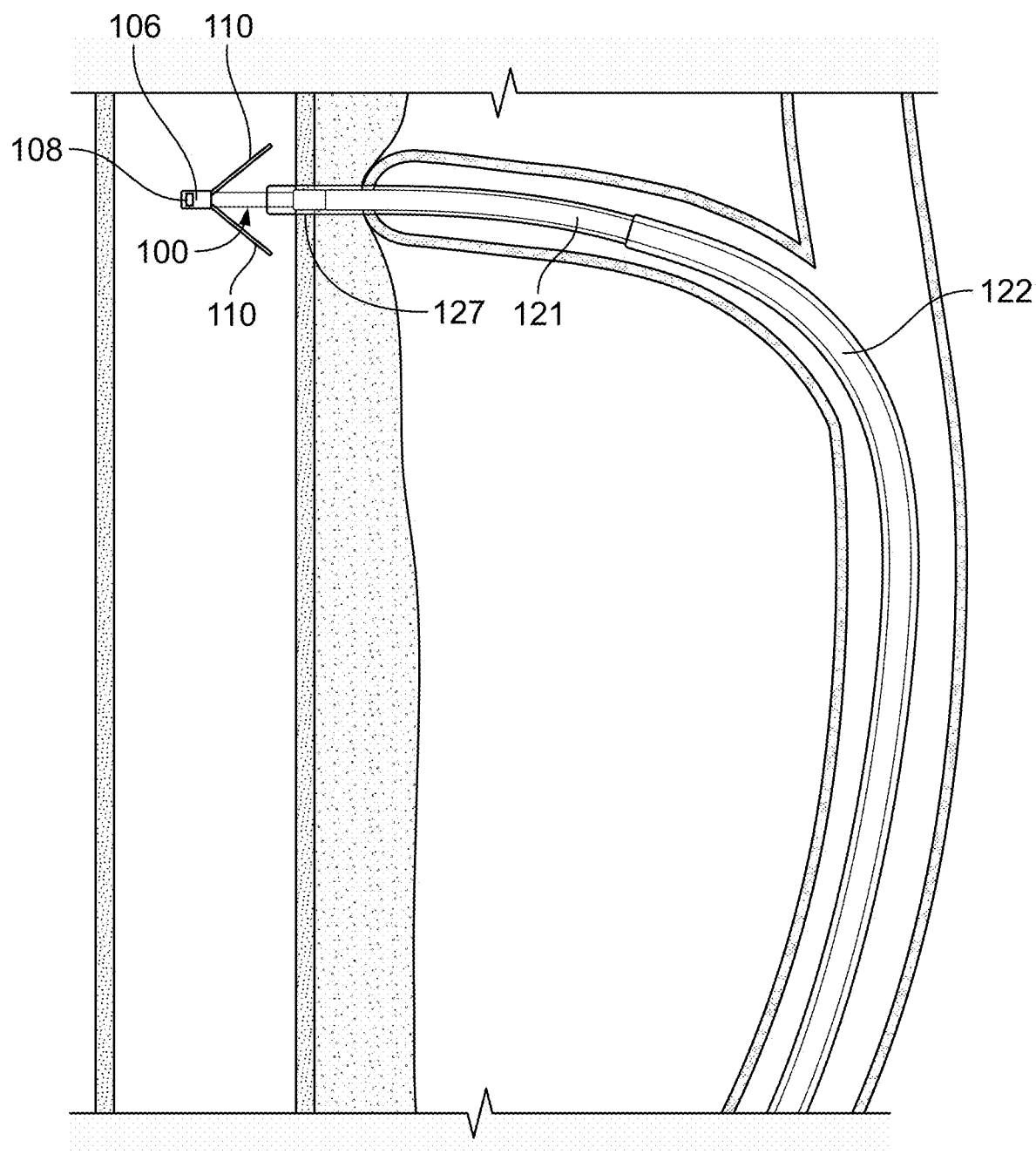
Figure 19H:
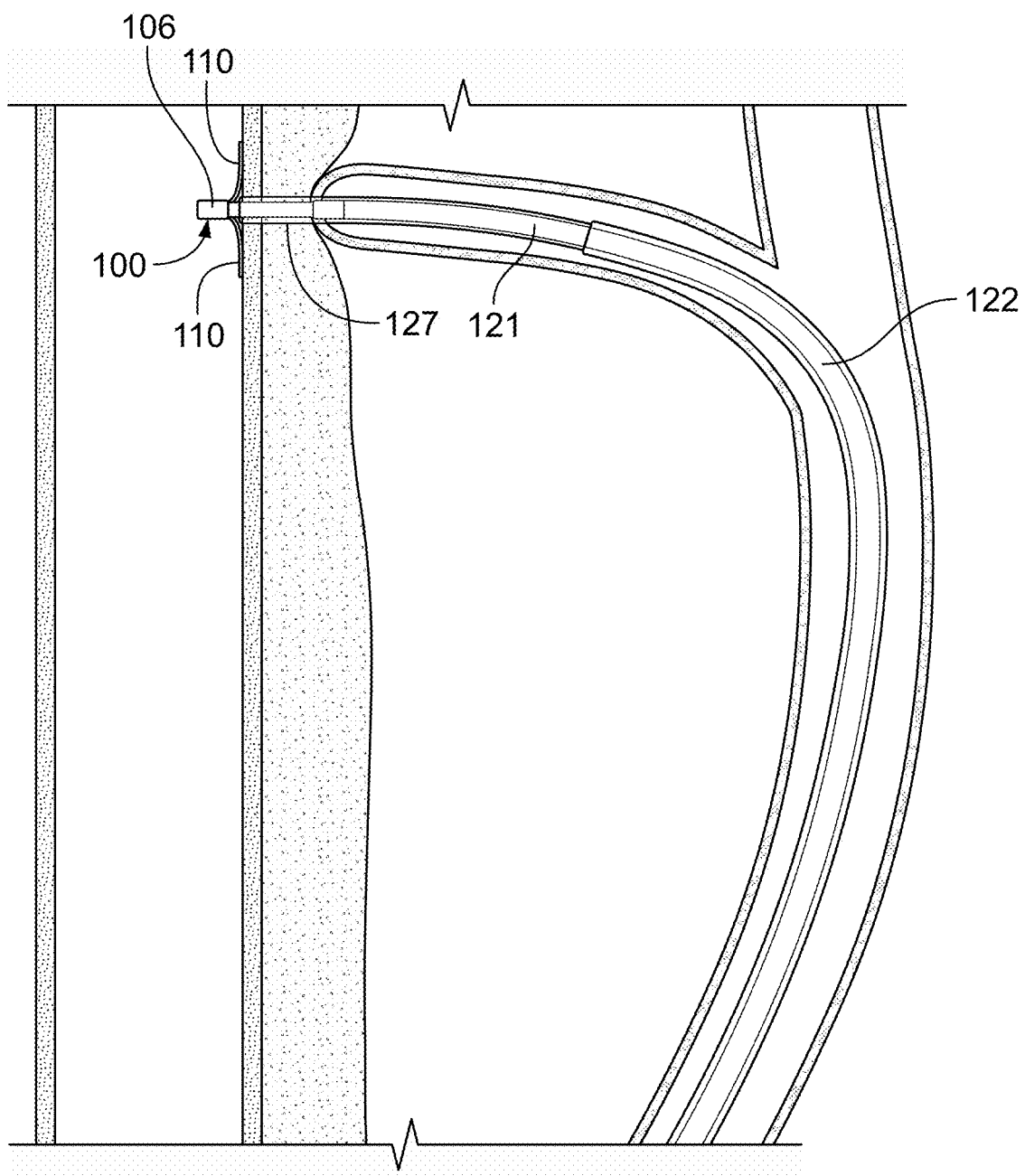

As shown in FIG. 19F, the CSF shunt 100 and the sheath 121 are advanced through the transdural catheter 127, such that a head of the CSF shunt 100 is positioned in the thecal sac 12. The CSF shunt 100 may be forced forward via the sheath 121, as discussed above. The embodiment of the CSF shunt 100 shown includes tines 110. The tines 110 are compressed as the CSF shunt 100 is advanced through the transdural catheter 127. The tines 110 may have radiopaque markers to allow the surgeon to visually confirm that the tines 110 have fully transversed the transdural catheter 127 and have entered the thecal sac 12. As shown in FIG. 19G, as the CSF shunt 100 is advanced further, the tines 110 are advanced past the distal end of the transdural catheter 127, and the tines 110 decompress, thereby extending outwardly. Radiopaque markers 108 may be located in or on the tines 110, such that the surgeon can see if the tines 110 have exited the transdural catheter 127 and entered the thecal sac 12. As shown in FIG. 19H, the CSF shunt 100 and the transdural catheter 127 are partially retracted, such that the tines 110 engage with the interior wall of the dura 22. A directional nature of the tines 110 can cause them to expand against the interior wall of the dura 22 after being retracted, ensuring that the CSF shunt head 106 is stabilized within the thecal sac 12. Further, the cross-sectional area of the shunt head 106 can be effectively larger than the dura 22 puncture hole, preventing retrograde movement of the CSF shunt 100 back into the venous system. As shown, the transdural catheter 127 still extends transdurally across the dura 22. The delivery system 120 can partially retract the CSF shunt 100 in different possible ways, such as by a retention wire 128, which will be further discussed.

Figure 19I:
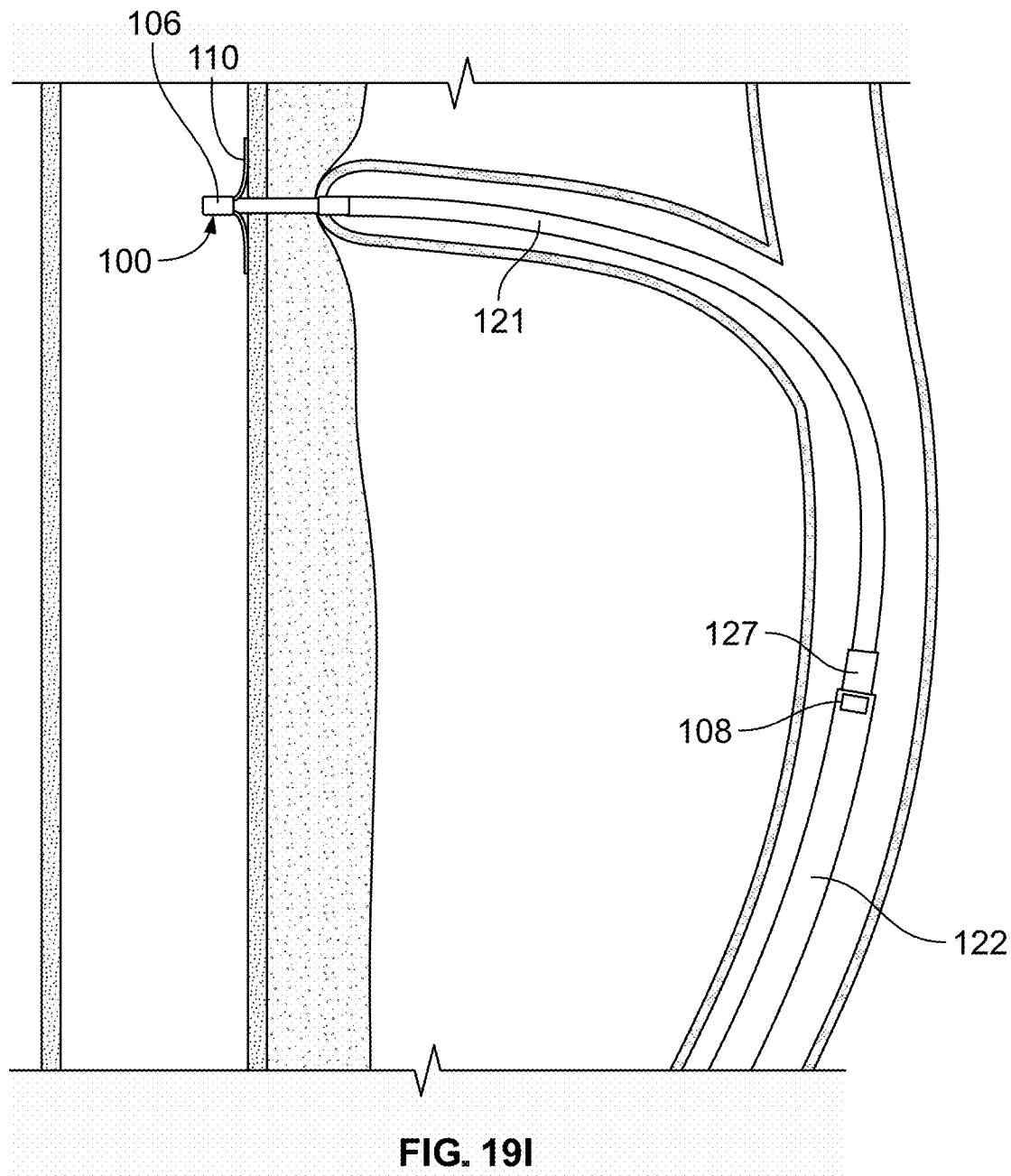
Figure 19J:
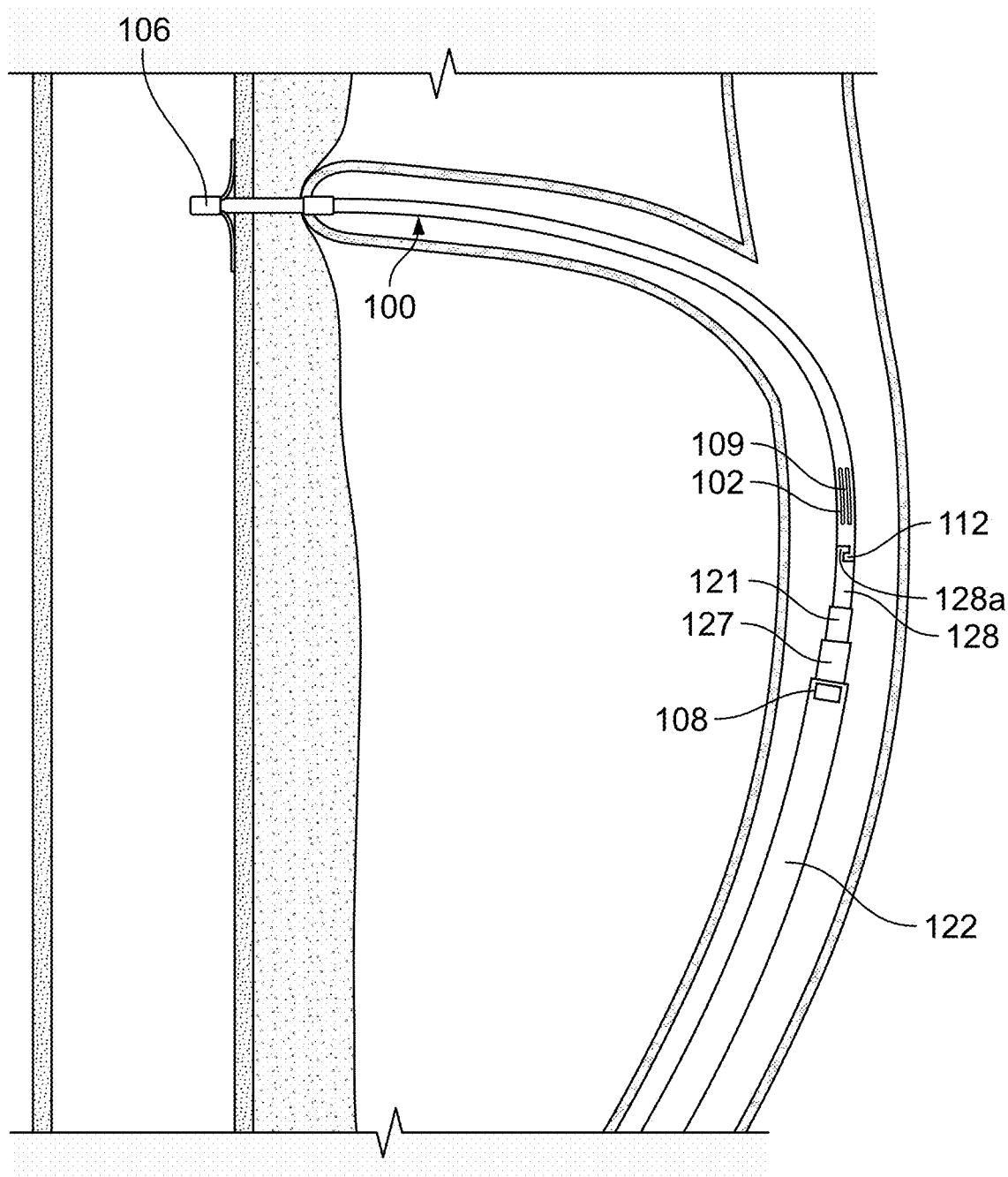
Figure 19K:
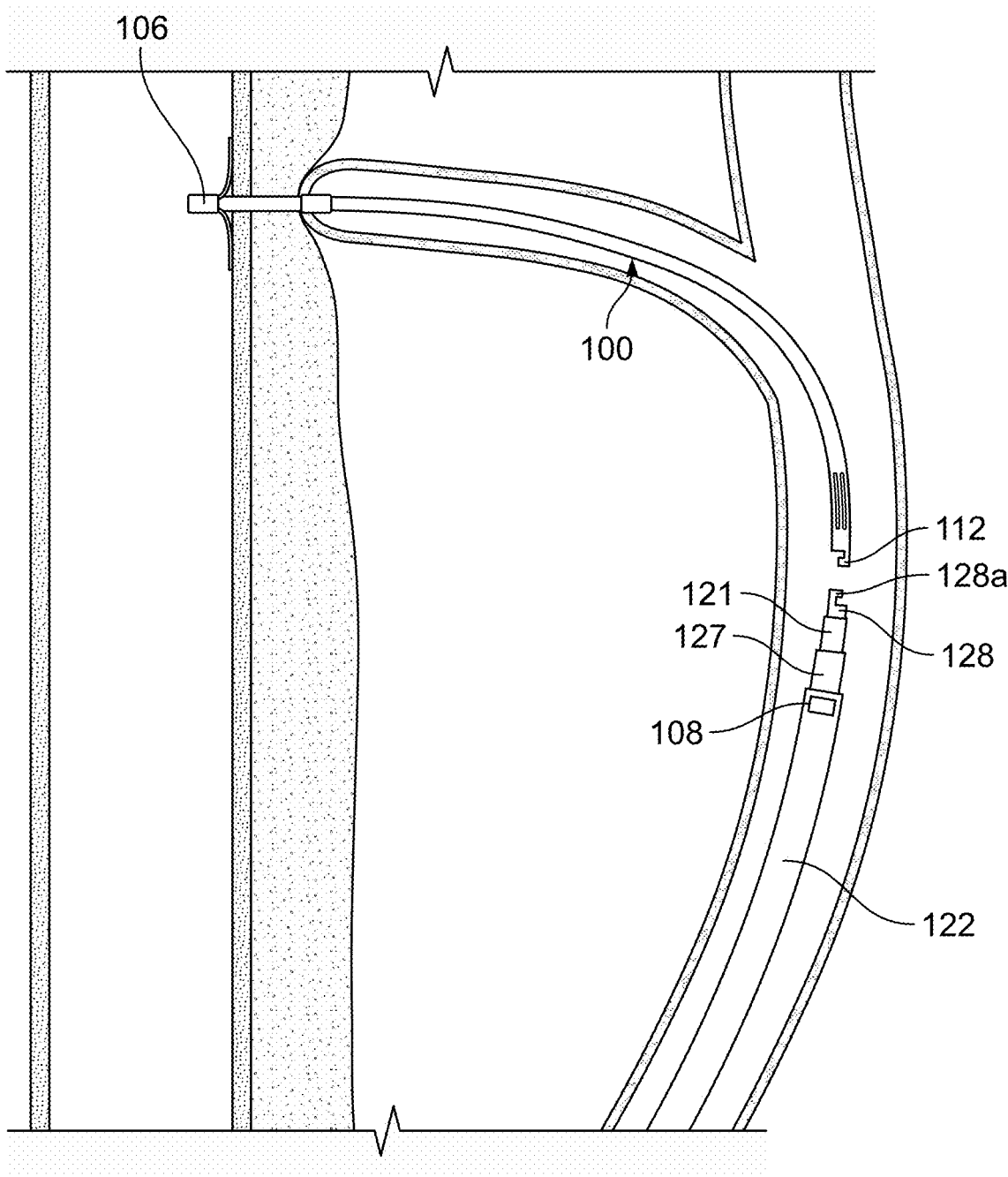

As shown in FIG. 19i, the delivery system 120 can be at least partially retracted. The guide catheter 122 may be retracted first, such that the distal tip of the guide catheter 122 is more proximal than the entirety of the CSF shunt 100. Then, the transdural catheter 127 can be retracted, again past the CSF shunt 100. As shown in FIG. 19J, the sheath 121 is retracted, again past the CSF shunt 100. The retention wire 128, which engages with the CSF shunt 100 as will be further discussed, can be exposed. The retention wire 128 has an engagement feature 128a that engages with a corresponding engagement feature 112 on the CSF shunt 100. As shown in FIG. 19K, the retention wire 128 is disengaged from the CSF shunt 100. The delivery system is then fully retracted, having delivered the CSF shunt 100 to its proper and final implantation location.

Figure 20A:
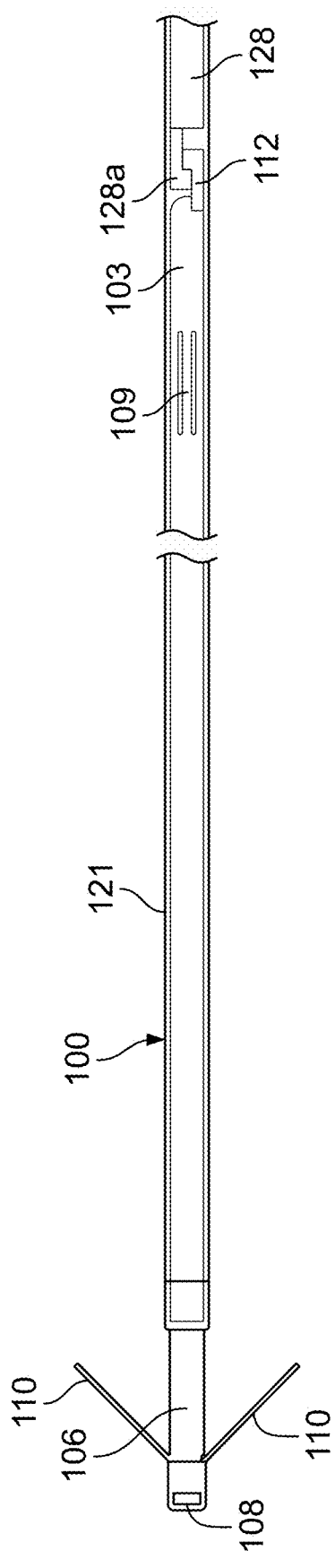
FIGS. 20A, 20B, and 20C show a sequence of disengaging the CSF shunt from a retention wire, according to embodiments.
Figure 20B:
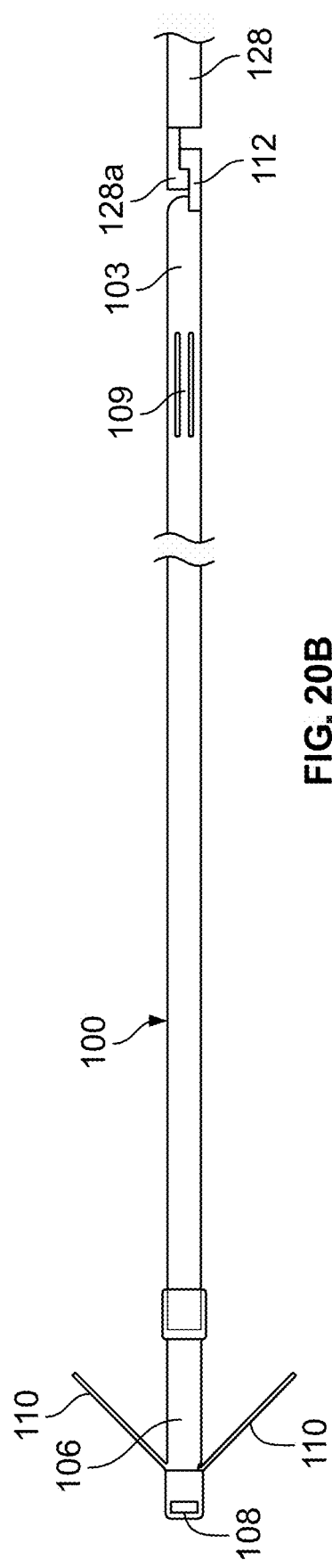
Figure 20C:
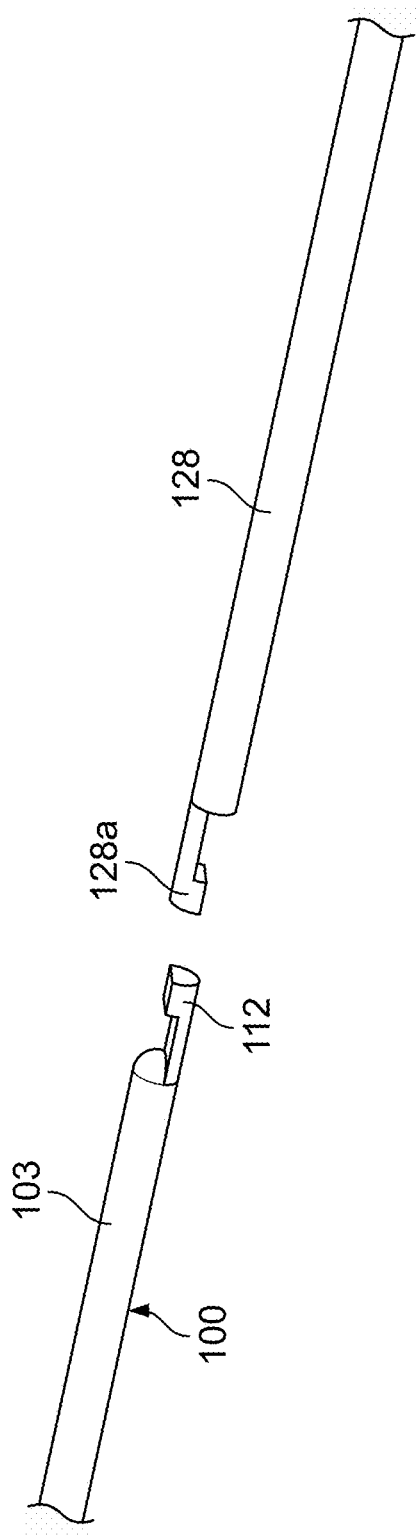

FIGS. 20A-20C show a sequence of disengaging the CSF shunt 100 from the retention wire 128. The retention wire 128 can enable the surgeon to either push the CSF shunt 100 forward through the guide catheter 122 via the sheath 121 to deploy or, if necessary, retract the CSF shunt 100 at any time before deployment. As shown in FIG. 20A, the CSF shunt 100 includes the engagement feature 112, which extends proximally from the shunt body 103 in this embodiment. The engagement feature 112 engages with the corresponding engagement feature 128a on a distal region of the retention wire 128. The sheath 121 may cover the engagement region during deployment of the CSF shunt. The sheath 121 may inhibit disengagement of the retention wire 128 from the CSF shunt 100 during deployment. The internal diameter of the sheath 121 may be sized appropriately to restrict the relative/lateral motion between the retention wire engagement feature 128a and the proximal retention feature 112 on the CSF shunt 100. The internal diameter of the transdural catheter 127 and/or the guide catheter 122 may be sized appropriately to allow the relative motion between the retention wire engagement feature 128a and proximal retention feature 112, such that the two engagement features will disengage when the sheath 121 is retracted proximal to the engagement region. As shown in FIG. 20B, the sheath 121 is retracted, thereby exposing the engagement region. As shown in FIG. 20C, the retention wire 128 is disengaged from the CSF shunt 100. The retention wire 128 may be disengaged by rotating it with respect to the CSF shunt 100.

Figure 21A:
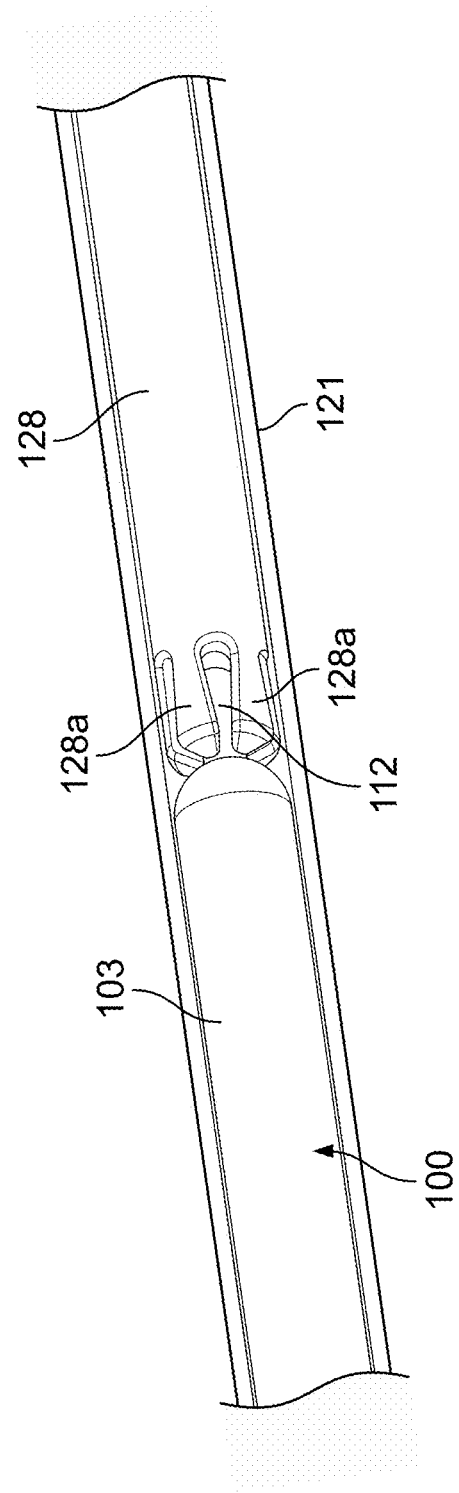
FIGS. 21A and 21B an embodiment of engagement features.
Figure 21B:
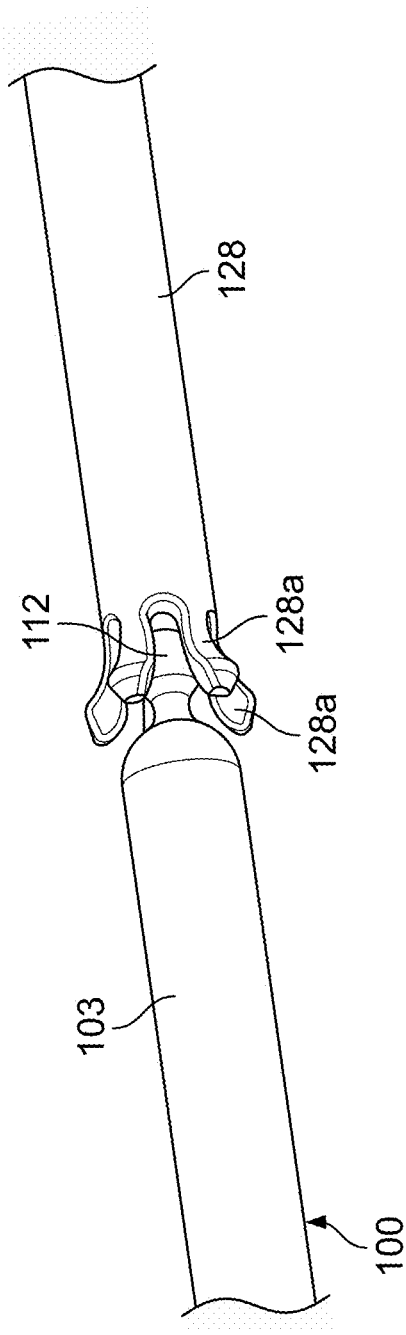

FIGS. 21A and 21B show another embodiment of the engagement features 112, 128a. The engagement feature 112 may include a ball, and the engagement feature 128a may include an expandable/contractable socket. The socket may include arms that act as springs. When the socket is pulled away from the ball, the arms expand and compress. When the ball has cleared the arms, they may contract and return to their decompressed position as shown in FIG. 21B. When the sheath 121 covers the engagement region with the socket and ball, the sheath 121 may prevent the arms of the socket from sufficiently expanding to release the ball, thereby maintaining the coupling between the retention wire 128 and the CSF shunt 100. As another option, the arms may be compressed as shown in FIG. 21A and decompressed as shown in FIG. 21B.

Figure 22:
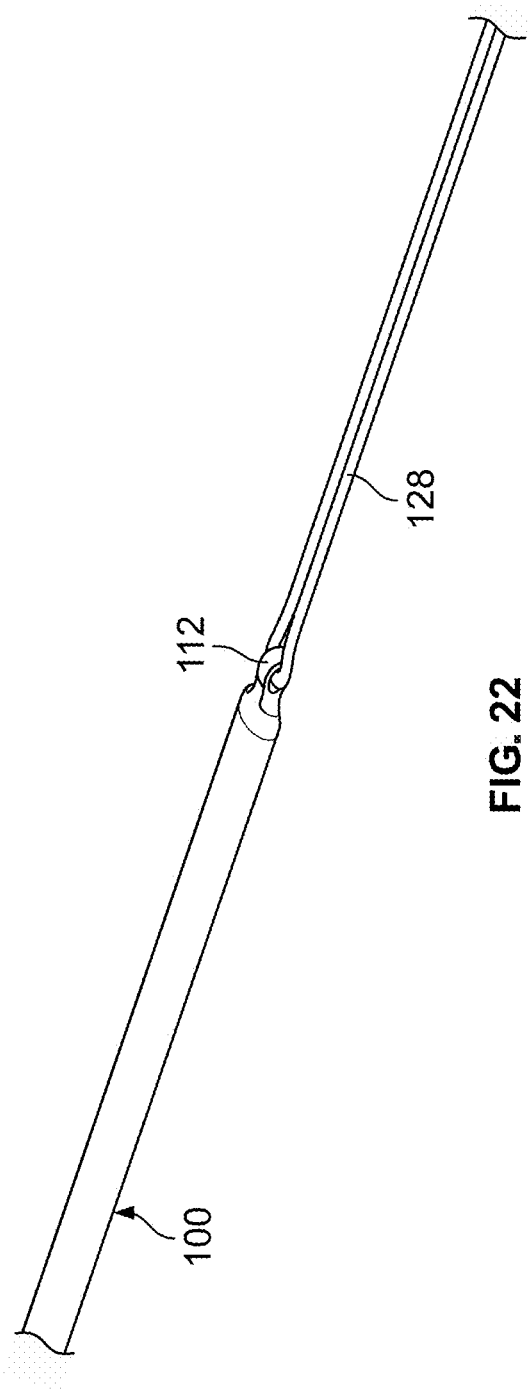
FIG. 22 shows an embodiment of the retention wire and engagement feature.

FIG. 22 shows another embodiment of the retention wire 128 and engagement feature 112. The retention wire 128 may include a suture/wire loop, and the retention feature 112 may include an eyelet. The retention wire 128 can be pulled out (by pulling on one strand) of the CSF shunt 100 after successful implantation, and the retention wire 128 can be fully retracted from the patient by continuing to pull the strand.

Figure 23B:
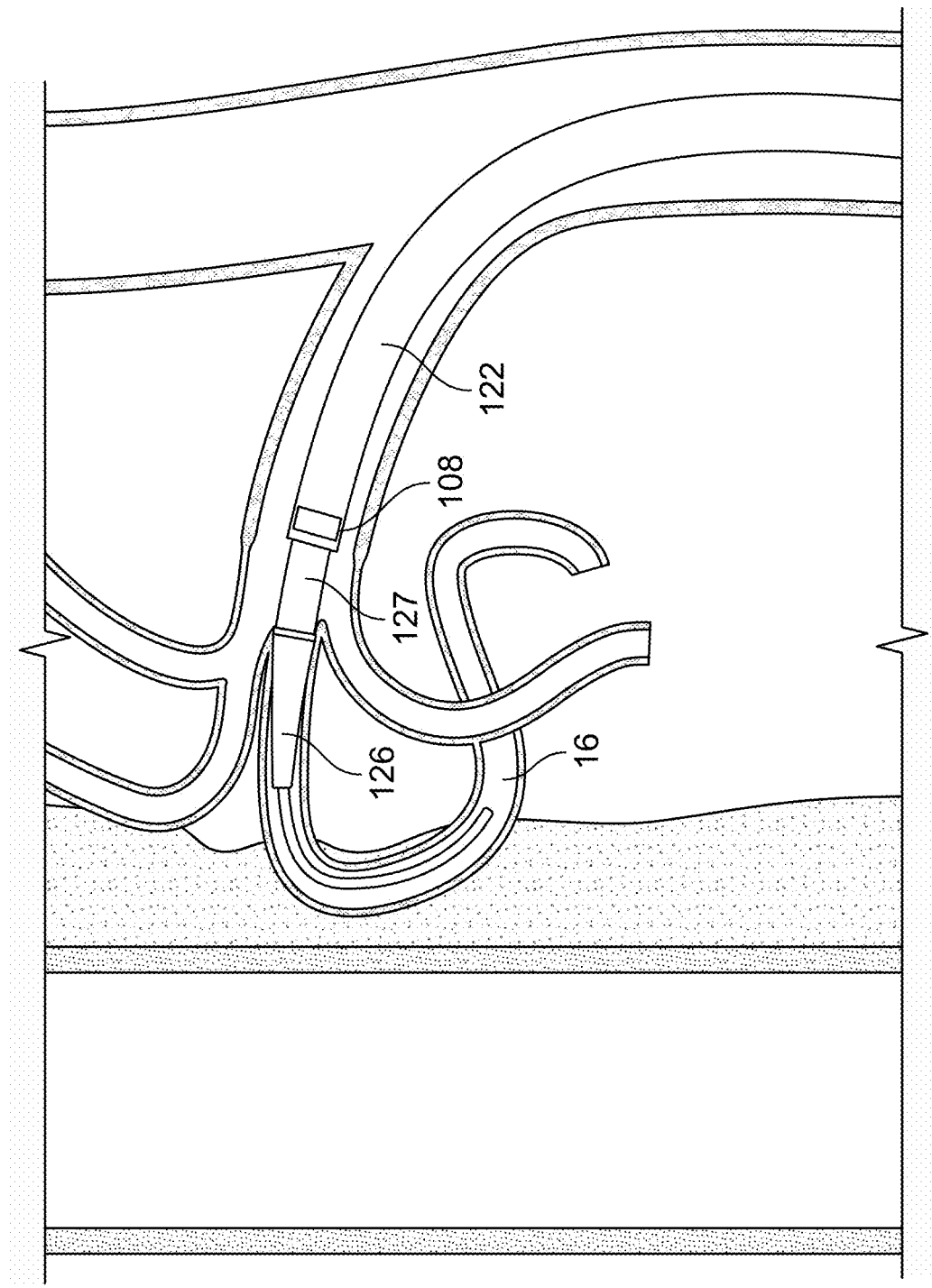

FIGS. 23A-23C illustrate another embodiment of a technique for deploying the CSF shut 100. In some instances, the intervertebral veins 16 may be too narrow for the guide catheter 122 to be fully distally positioned. Or, more generally, it may be desired to keep the guide catheter 122 in a more proximal position during deployment of the CSF shut 100. According to this embodiment, a guidewire 129 is advanced through the guide catheter 122. The distal tip of the guidewire 129 is positioned distally from the intended puncture site. The distal opening of the guide catheter 122 can remain in the larger vessel. The CSF shunt 100 and at least a portion of the delivery system 120 can be passed through the guide catheter 122 and threaded along the guidewire 129, progressing into the intervertebral vein 16 up to the desired puncture location.

FIG. 23A shows the guide catheter 122 in a larger area of the venous system 20, while the guidewire 129 has been advanced into narrower areas in the intervertebral vein 16 or anterior venous plexus 17. As shown in FIG. 23B, the dilator 126 and the transdural catheter 127 are advanced through the guide catheter 122 and over the guidewire 129. As shown in FIG. 23C, the guidewire 129 is retracted and the stylet 123 is advanced through the guide catheter 122, the transdural catheter 127, and through the dilator 126, and out of the distal region of the dilator 126. The stylet 123, dilator 126, and transdural catheter 127 are then in a proper position to puncture tissues to prepare the patient's anatomy for implantation of the CSF shunt 100.

Figure 24A:
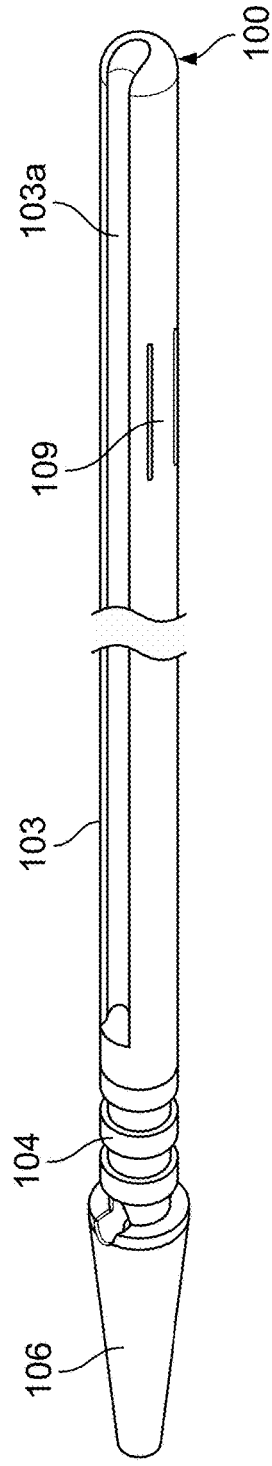
FIGS. 24A and 24B show an embodiment of the CSF shut and the stylet.
Figure 24B:
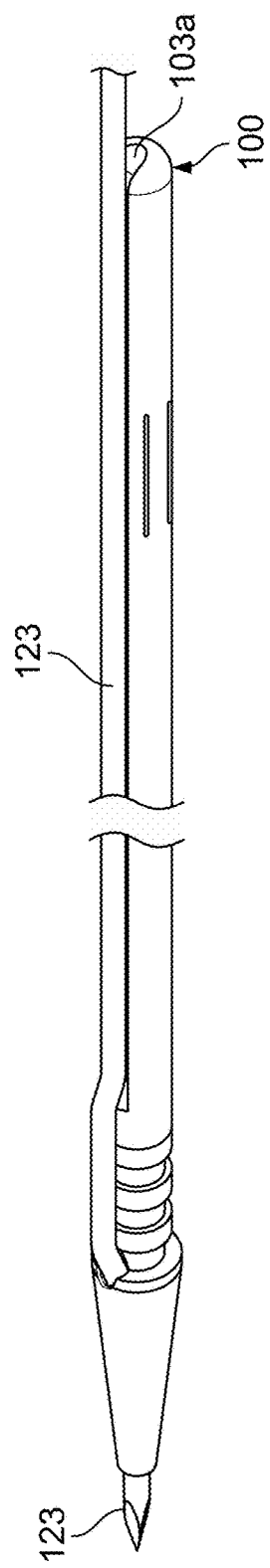
Figure 25:
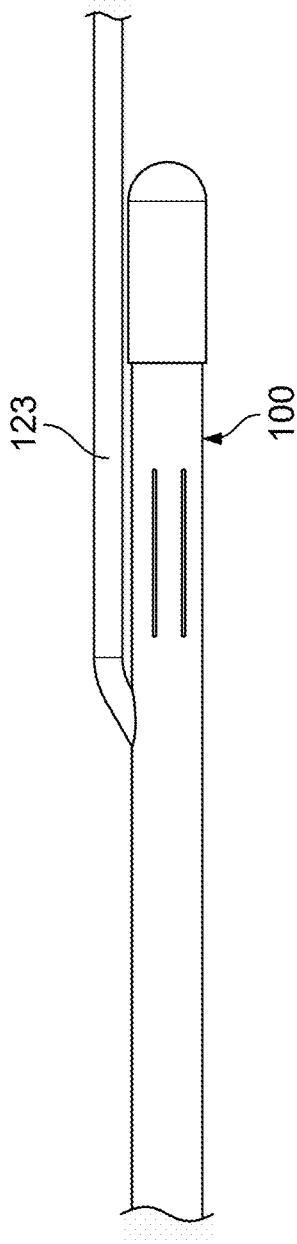
FIG. 25 shows an embodiment of the CSF shunt and the stylet.

FIGS. 24A and 24B show another embodiment of the CSF shut 100 and the stylet 123, where the stylet does not pass through a proximal seal 107 or a hollow interior region of the shunt body 103 (or a portion thereof). Instead, the shunt body 103 has a groove 103a that receives the stylet 123. The stylet 123 can be movable along the groove 103a. The stylet 123 can extend through the shunt head 106 via an aperture therein, or an aperture in the ribs 104. According to this embodiment, the proximal seal 107 can be omitted. FIG. 25 shows an example of a stylet 123 extending along the groove 103a (not visible), but the CSF shunt 100 still includes a proximal seal 107. Such an arrangement may be useful if the proximal seal 107 could also act as a secondary flow regulator.

Figure 26:
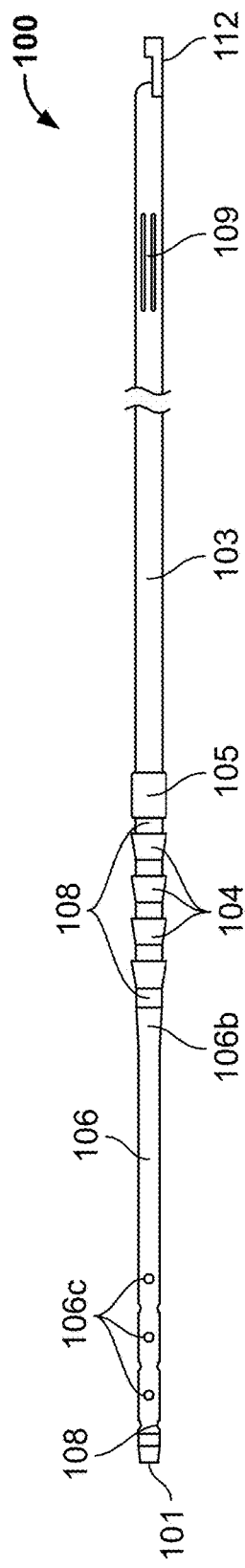
FIG. 26 illustrates a CSF shunt, according to embodiments.

FIG. 26 illustrates another embodiment of the CSF shunt 100. The ribs 104 are "one-way", allowing for distal movement of the CSF shunt 100 through certain tissues (e.g., the dura 22), while inhibiting proximal movement of the CSF shunt 100. The ribs 104 can be tapered on their distal regions, and vertical or nearly vertical in their proximal regions. These ribs 104 can reside in and around the 22 dura, interstitial tissue 21, and/or the wall of a vein, retaining the CSF shunt 100 into position. This embodiment shows the shunt head 106 as being more elongate than other embodiments depicted herein. The shunt head 106 may be flexible, while other shunt heads 106 may be rigid (or flexible). The shunt head 106 may be between about 1 to about 8 cm in length, such as between about 2 to about 3 cm. The shunt head 106 can also contain lateral ports 106c to allow for CSF to enter the CSF shunt 100, optionally in addition to the inlet 101. The shunt head 106 may also include a tapered region 106b that tapers down to a smaller inner and/or outer diameter along the length of the shunt head 106 from the proximal region to the distal region. Radiopaque markers 108 may be provided in or on the proximal region or the distal region or at other regions of the shunt body 106. For example radiopaque markers 108 may be positioned immediately around the ribs 104 (proximal and distal to the ribs 104) to indicate to the surgeon where to place the ribs 104 with respect to the dura 22 (e.g., one proximal to the dura 22 and one distal from the dura 22).

Figure 27:
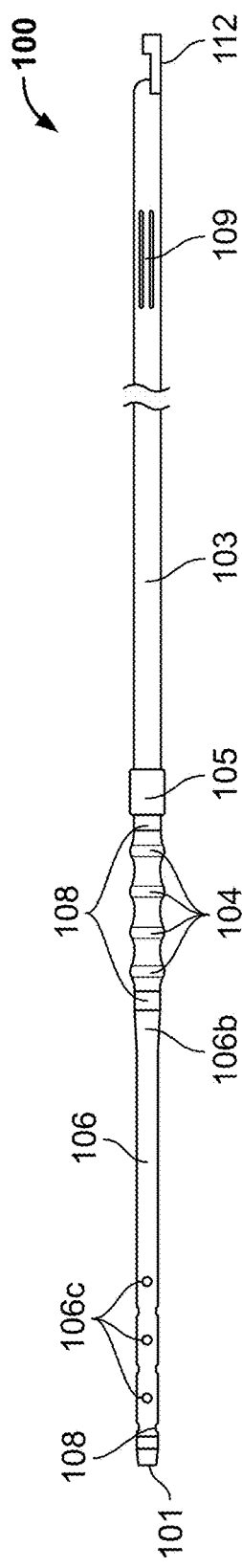
FIG. 27 illustrates a CSF shunt, according to embodiments.

FIG. 27 illustrates another embodiment of the CSF shunt 100. This CSF shunt 100 is a variation of the one shown in FIG. 26, except that the ribs 104 are corrugations. The corrugated region could be from between about 5 to about 30 mm long, such as for example between about 10 to about 15 mm long.

Figure 28:
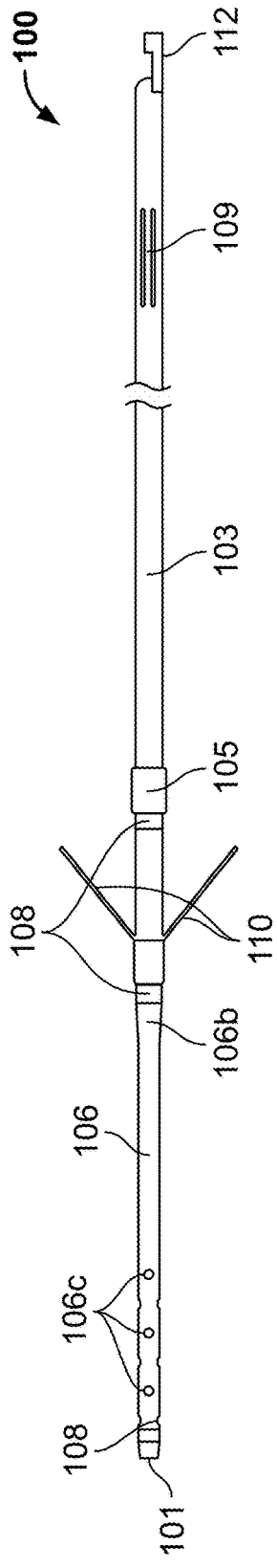
FIG. 28 illustrates a CSF shunt, according to embodiments.

FIG. 28 illustrates another embodiment of the CSF shunt 100. This CSF shunt 100 is a variation of the one shown in FIG. 26, except that instead of ribs 104, flexible tines 110 are included. Instead of abutting or engaging with the intradural surface of the dura 22, the tines 110 may engage with the internal surface of a vein wall. The surgeon can position a radiopaque marker 108 in line with the dura 22, which may allow the tines 110 to open to their uncompressed state within the vein, such that the tips of the tines 110 can engage with the vein wall to stabilize the position of the CSF shunt 100. This configuration relies on fixation in the venous system 20 rather than within the dura 22, which could be advantageous to not impede on the nerve roots within the thecal sac 12.

Figure 29:
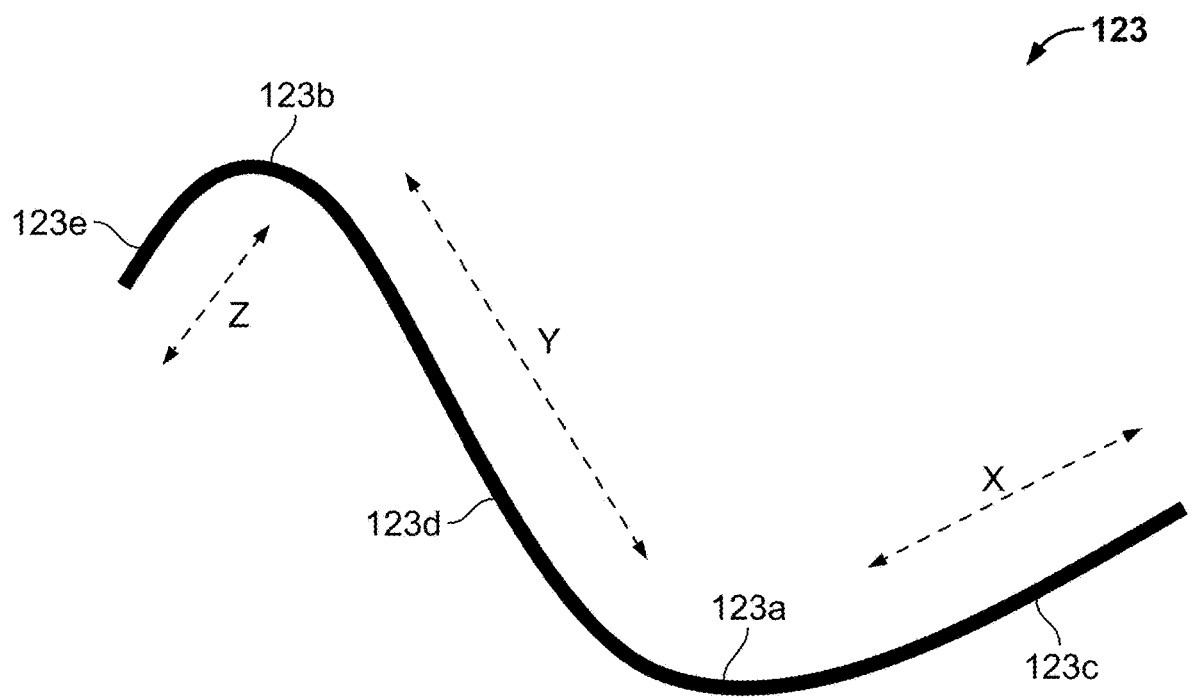
FIG. 29 illustrates a portion of a stylet, according to embodiments.

FIG. 29 illustrates a portion of a stylet 123, according to an embodiment. The stylet 123 extends along two planes-a first plane on the face of the page defined by the X and Y axes, and a second plane extending into the page along the Z axis. In this embodiment, the stylet 123 can be referred to as being bi-plane. The first curve 123a causes curvature of the stylet 123 in the first plane. The second curve 123b causes the curvature of the stylet 123 to extend away from the first plane and along the second plane. The second curve 123b is distal from the first curve 123a, and more proximate to the tip of the stylet 123. The first curve 123a and the second curve 123b define three segments of the stylet 123: a proximal segment 123c, a medial segment 123d, and a distal segment 123c. The proximal segment 123c and the medial segment 123d may be in a first plane. The distal segment 123e may be in a second plane different than the first plane.

The first curve 123a mimics or conforms to a curvature in the venous system 20 proximate the puncture site. Such a curvature in a patient's anatomy is the curvature of the lumbar vein 15 to the intervertebral vein 16.

Figure 30A:
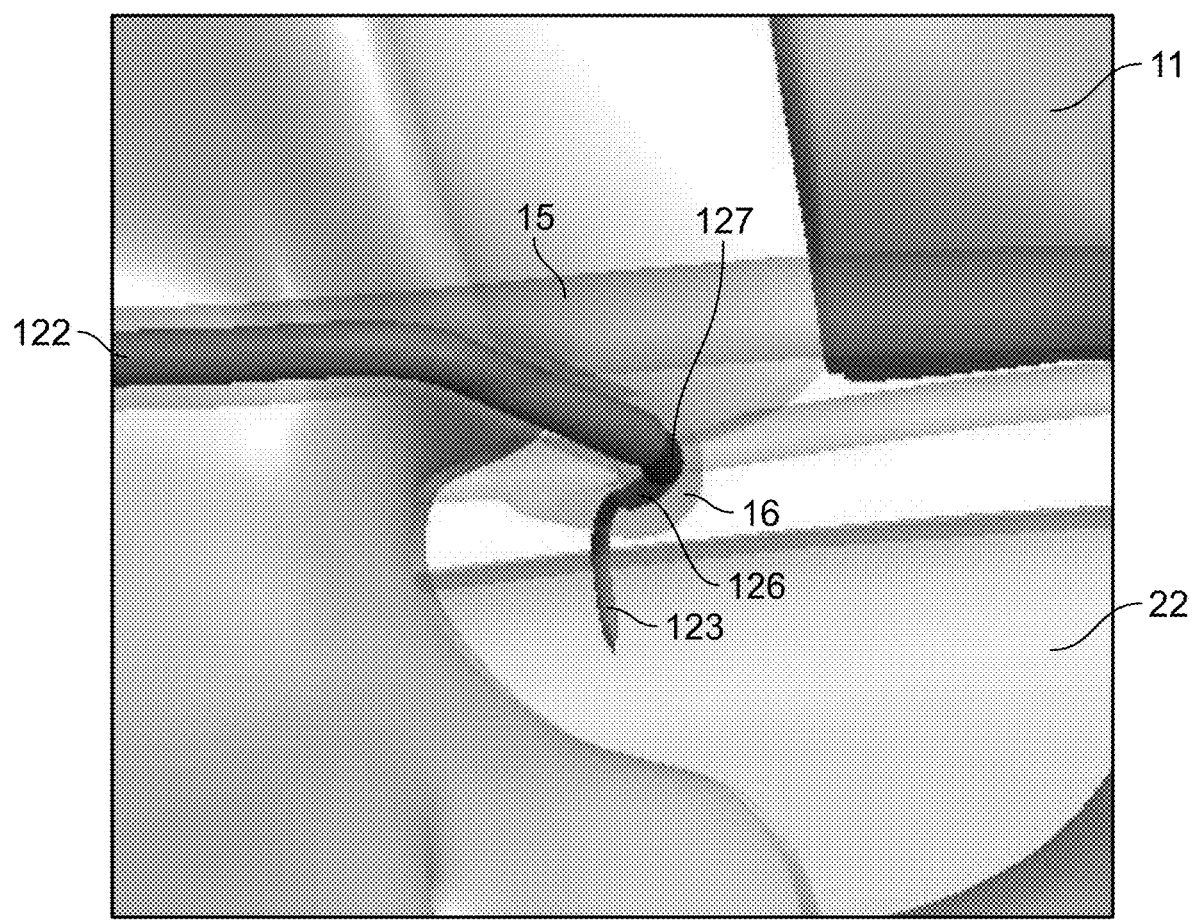
FIGS. 30A and 30B show different views of the stylet along with the dilator as it has been advanced through the patient's anatomy, according to embodiments.
Figure 30B:
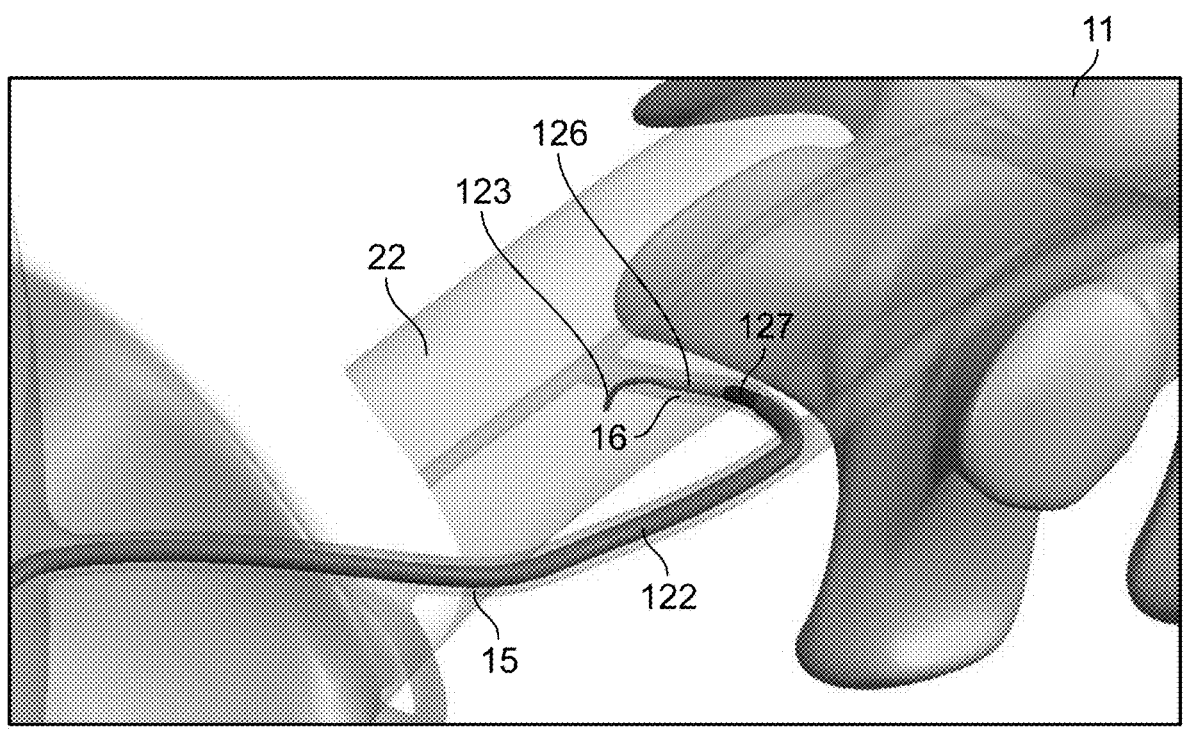

As the stylet 123 is being inserted, when the first curve 123a reaches a predetermined location (e.g., at the curvature between the lumbar vein 15 and the intervertebral vein 16), the stylet 123 self-orients, thereby impacting the orientation of the second curve 123b. When in situ, the second curve 123b is automatically oriented in a medial and posterior direction and takes an approximately perpendicular path toward the thecal sac 12 when advanced to puncture the dura 22. The first curve 123a may have a radius from about 2 to about 50 cm, such as from about 15 to 25 cm. The first curve 123a may have a central angle (also known as a deflection angle or angle of intersection, and which defines the arc length) between about 20 to about 90 degrees, such as from about 40 to about 70 degrees. The radius of the second curve 123b may be in a range from about 5 to about 30 cm, such as between about 10 to about 20 cm. The central angle of the second curve 123b may be comparable to the proximal curve. The second curve 123b may be offset (out of plane) from the first curve 123a by about 30 to about 180 degrees, such as from about 70 to about 90 degrees. FIGS. 30A and 30B show different views of the stylet 123 (along with the dilator 126) as it has been advanced through the patient's anatomy through the guide catheter 122 and the transdural catheter 127 through the patient's anatomy. Multiple curve designs may be possible with any number of varying combinations of bend radii (e.g. parabolic curves) and offset angles for the proximal curve to account for anatomical variations in the curvature of junction between the lumbar vein 15 and intervertebral vein 16. For example, the first curve 123a might have a slight corkscrew shape to accommodate/align to complex anatomy.

The stylet 123 may include nitinol in its superelastic state at body temperature ($A_f$ from 0 to 25 degrees C.), thus allowing for increased flexion (e.g., up to about 8% without plastic deformation) while transversing up the guide catheter 122 to the desired exit point in a vein wall. The stylet 123 could also comprise of a different highly flexible material such as a cobalt-chromium alloy. The stylet 123 could also comprise of nitinol (or similar) with a radiopaque core (such as platinum or tantalum) to increase the radiopacity of the stylet 123 under fluoroscopy. The stylet could also have individual radiopaque marker bands along the length to help fluoroscopic visualization. The stylet 123 diameter can range from about 0.010" to about 0.035", such as for example between about 0.014" to about 0.018". The stylet 123 diameter can also have variable diameter grind such that the distal section is smaller in diameter as compared to the proximal section.

While advancing the stylet 123 up to the tip of the guide catheter 122, the first curve 123a and the second curve 123b can be different (i.e. have a greater radius) due to compression of the stylet 123 against a containing catheter (e.g., the guide catheter 122 and/or the transdural catheter 127). When entering the intravertebral region at a predetermined location where the first curve 123a corresponds to the particular anatomical region (e.g., the intersection between the lumbar vein 15 and a given intervertebral vein 16), the stylet 123 will at least partially decompress, thereby orienting the stylet 123 (including orienting the second curve 123b) into a desired orientation. The stylet 123 at the first curve 123a may decompress completely or at least partially to correspond to the curvature in the venous system 20 where the first curve 123a is located. The second curve 123b can become oriented due to the orientation of the first curve 123a such that the puncturing tip of the stylet 123 becomes oriented approximately perpendicularly with respect to the dura 22.

| Parts List: | |
|---|---|
| Part No. | Description |
| 10 | Lumbar region |
| 11 | Vertebral body |
| 12 | Thecal sac |
| 13 | Foramen space |
| 14 | Iliac vein |
| 15 | Ascending lumbar vein |
| 16 | Intervertebral vein |
| 17 | Anterior epidural venous plexus |
| 18 | Posterior epidural venous plexus |
| 19 | Epidural venous plexus |
| 20 | Venous system |
| 21 | Interstitial tissue |
| 22 | Dura |
| 100 | CSF shunt |
| 101 | Inlet |
| 102 | Outlet |
| 103 | Shunt body |
| 103a | Groove |
| 104 | Ribs |
| 105 | Abutment portion |
| 106 | Shunt head |
| 106a | Feature |
| 106b | Tapered region |
| 106c | Lateral ports |
| 107 | Proximal seal |
| 107a | Spines/Fingers |
| 107b | Cinching ring |

-continued

| Parts List: | |
|---|---|
| Part No. | Description |
| 108 | RO marker |
| 109 | Flow regulator |
| 110 | Tines/wings |
| 111 | Fins |
| 112 | Engagement feature |
| 120 | Shunt delivery system |
| 121 | Sheath |
| 122 | Guide catheter |
| 123 | Stylet |
| 123a | First curve |
| 123b | Second curve |
| 123c | First segment |
| 123d | Second segment |
| 123e | Third segment |
| 123f | Distal Aperture |
| 123g | Engagement feature |
| 124 | Inner catheter |
| 125 | Proximal support catheter |
| 125a | Insertion Portion |
| 126 | Dilator |
| 127 | Transdural catheter |
| 128 | Retention wire |
| 128a | Engagement feature |
| 129 | Guidewire |

It will be understood by those skilled in the art that various changes may be made and equivalents may be substituted without departing from the scope of the novel techniques disclosed in this application. In addition, many modifications may be made to adapt a particular situation or material to the teachings of the novel techniques without departing from its scope. Therefore, it is intended that the novel techniques not be limited to the particular techniques disclosed, but that they will include all techniques falling within the scope of the appended claims.

The invention claimed is:

1. A system, comprising:
a stylet configured to puncture a vein wall, tissue in interstitial tissue, and a dura of a patient;
a dilator including a transverse hollow interior region extending to an aperture in a distal region, wherein the dilator is configured to receive the stylet in the hollow interior region and out through the aperture in the distal region, wherein the dilator is configured to pass through tissues punctured by the stylet, including the vein wall, the tissue in the interstitial tissue, and the dura; and
a transdural catheter including a hollow interior region configured to receive the dilator, wherein the transdural catheter is configured to traverse the tissues dilated by the dilator, including the vein wall, the tissue in the interstitial tissue, and the dura, such that a distal tip of the transdural catheter is configured to be located in a thecal sac of the patient such that a distal end of a cerebrospinal fluid (CSF) shunt can be advanced through the transdural catheter from a vein and into the thecal sac.

2. The system of claim 1, further comprising a guide catheter including a hollow interior region configured to receive the transdural catheter, such that the transdural catheter can be advanced through the dura.

3. The system, of claim 1, wherein the dilator is tapered downwardly from a proximal region of the dilator to a distal region of the dilator.

4. The system, of claim 1, wherein the stylet comprises superelastic nitinol.

5. The system of claim 1, wherein the dilator and transdural catheter are configured to be coupled and decoupled via a hub/handle mechanism.

6. The system, of claim 1, further comprising radiopaque markers on or in each of the stylet, dilator, and transdural catheter to facilitate positioning of these using fluoroscopy.

7. The system of claim 1, further comprising:
a cerebrospinal fluid (CSF) shunt including:
a shunt head in a distal region of the CSF shunt, wherein the shunt head includes an inlet in a distal region of the shunt head, wherein the shunt head further includes an abutment region; and
a shunt body coupled to the shunt head; and
a sheath including a hollow interior region and a distal region, wherein the hollow interior region is configured to receive the shunt body, and wherein the distal region is configured to abut the abutment region of the shunt head such that the shunt head can be advanced through a patient by applying a force to the sheath.

8. The system of claim 7, further comprising a retention component configured to engage and disengage with a proximal engagement feature on the CSF shunt, wherein the retention component and the proximal engagement feature on the CSF shunt engage in an engagement region.

9. The system of claim 8, wherein, both the proximal engagement feature on the CSF shunt and the retention component include at least one radiopaque marker.

10. The system of claim 8, wherein the proximal engagement feature on the CSF shunt and the retention component are configured to be covered by the sheath at the engagement region to inhibit disengagement of the proximal engagement feature and the CSF shunt, and wherein the CSF shunt and the retention component are configured to disengage when the sheath is withdrawn proximally past the engagement region between the proximal engagement feature of the CSF shunt and the retention component.

11. The system of claim 7, wherein the abutment region of the CSF shunt is configured to be located on a distal side of the patient's dura after deployment of the CSF shunt.

12. The system of claim 11, wherein a rib on the CSF shunt is configured to be located on a proximal side of the dura after deployment of the CSF shunt.

13. The system of claim 7, further comprising at least one radiopaque marker on the sheath configured to visualize, during fluoroscopy, retraction of the sheath relative to the abutment region of the CSF shunt during deployment.

14. The system of claim 1, wherein:
the stylet includes a first curve and a second curve distal from the first curve, wherein the first curve and the second curve define a proximal segment, a medial segment, and a distal segment of the stylet;
wherein the proximal segment and the medial segment are in a first plane; and
wherein the distal segment is in a second plane different from the first plane.

15. The system of claim 14, wherein the first curve has a radius between about 15 cm to about 25 cm.

16. The system of claim 15, wherein a central angle of the first curve is between about 40 degrees to about 70 degrees.

17. The system of claim 14, wherein the second curve has a radius between about 10 cm to about 20 cm.

18. The system of claim 17, wherein a central angle of the second curve is between about 40 degrees to about 70 degrees.

19. The system of claim 14, wherein the stylet is configured to puncture the vein wall, the interstitial tissue, and the dura.

20. The system of claim 14, wherein the stylet has a hollow interior region.

* * * * *